(12) United States Patent
Murai et al.

(10) Patent No.: US 8,885,633 B2
(45) Date of Patent: Nov. 11, 2014

(54) DATA COMMUNICATION METHOD, DATA COMMUNICATION SYSTEM, AND COMMUNICATION TERMINAL

(75) Inventors: Yusuke Murai, Tokyo (JP); Masayuki Doi, Tokyo (JP); Akiho Shibata, Tokyo (JP); Takafumi Okaniwa, Tokyo (JP); Tatsuhiro Aoyagi, Tokyo (JP)

(73) Assignee: Vodafone Group PLC, Newbury, Berkshire (GB)

( * ) Notice: Subject to any disclaimer, the term of this patent is extended or adjusted under 35 U.S.C. 154(b) by 2158 days.

(21) Appl. No.: 11/374,195

(22) Filed: Mar. 14, 2006

(65) Prior Publication Data

US 2006/0179135 A1    Aug. 10, 2006

Related U.S. Application Data

(63) Continuation of application No. PCT/JP2005/002909, filed on Feb. 23, 2005.

(30) Foreign Application Priority Data

Feb. 27, 2004   (JP) ................ 2004-054937
Feb. 27, 2004   (JP) ................ 2004-054973

(51) Int. Cl.
| | |
|---|---|
| H04L 12/66 | (2006.01) |
| H04W 52/02 | (2009.01) |
| H04W 28/18 | (2009.01) |
| H04W 88/02 | (2009.01) |
| H04W 28/02 | (2009.01) |
| H04W 28/06 | (2009.01) |
| H04W 8/24 | (2009.01) |
| H04W 28/14 | (2009.01) |

(52) U.S. Cl.
CPC ............ *H04W 28/18* (2013.01); *H04W 52/02* (2013.01); *H04W 28/06* (2013.01); *H04W 88/02* (2013.01); *H04W 8/245* (2013.01); *H04W 52/0209* (2013.01); *H04W 28/14* (2013.01); *H04W 28/0221* (2013.01); *H04W 52/0261* (2013.01)
USPC ........... 370/352; 370/353; 370/355; 370/356; 455/428; 455/550.1; 455/574; 709/223

(58) Field of Classification Search
USPC .......................... 709/217–228; 370/352–356; 455/550–574
See application file for complete search history.

(56) References Cited

U.S. PATENT DOCUMENTS 6,647,442 B1 * 11/2003 Shimada et al. ............... 710/52
6,931,198 B1    8/2005 Hamada et al. ................ 386/46

(Continued)

FOREIGN PATENT DOCUMENTS

CN    1323148 A    11/2001
JP    2000-032429    1/2000

(Continued)

*Primary Examiner* — Melanie Jagannathan
*Assistant Examiner* — Najeebuddin Ansari
(74) *Attorney, Agent, or Firm* — Kratz, Quintos & Hanson, LLP

(57) ABSTRACT

A portable telephone unit 10 receives management information comprising size information for contents data wanting to be downloaded, and adjusts an environment for receiving the object data, based on size information for contents data contained in the management information. To adjust the environment for receiving the object data it is possible, for example, to determine a communication system for receipt, or to secure a storage region for storing object data that has been received. After that, the portable telephone unit 10 transmits a contents data download request, and receives contents data returned in response to the download request. As a result, it is possible for the communication terminal to download the contents data in a state where the receive environment has been optimized according to the size of the contents.

24 Claims, 16 Drawing Sheets

(56) References Cited

U.S. PATENT DOCUMENTS

| | | | |
|---|---|---|---|
| 2001/0039194 A1* | 11/2001 | Odamura | 455/550 |
| 2002/0073140 A1* | 6/2002 | Chae | 709/201 |
| 2002/0078092 A1* | 6/2002 | Kim | 707/513 |
| 2002/0177475 A1* | 11/2002 | Park | 455/574 |
| 2003/0029911 A1* | 2/2003 | Kitayama | 235/100 |
| 2004/0002367 A1* | 1/2004 | Chanut | 455/574 |
| 2004/0014489 A1* | 1/2004 | Miyachi et al. | 455/550.1 |
| 2004/0041538 A1* | 3/2004 | Sklovsky | 320/127 |
| 2004/0070511 A1* | 4/2004 | Kim | 340/636.1 |
| 2004/0128382 A1* | 7/2004 | Shimoda et al. | 709/225 |
| 2004/0183828 A1* | 9/2004 | Nichogi et al. | 345/745 |
| 2005/0085277 A1* | 4/2005 | Chen et al. | 455/572 |
| 2011/0170837 A1* | 7/2011 | Barnes, Jr. | 386/239 |

FOREIGN PATENT DOCUMENTS

| | | |
|---|---|---|
| JP | 2001-290777 | 10/2001 |
| JP | 2001-320424 | 11/2001 |
| JP | 2002-041421 | 2/2002 |
| JP | 2002-157161 | 5/2002 |
| JP | 2002-315203 | 10/2002 |
| JP | 2003-141009 | 5/2003 |
| JP | 2003-177949 | 6/2003 |
| JP | 2004-021304 | 1/2004 |

* cited by examiner

Fig. 12
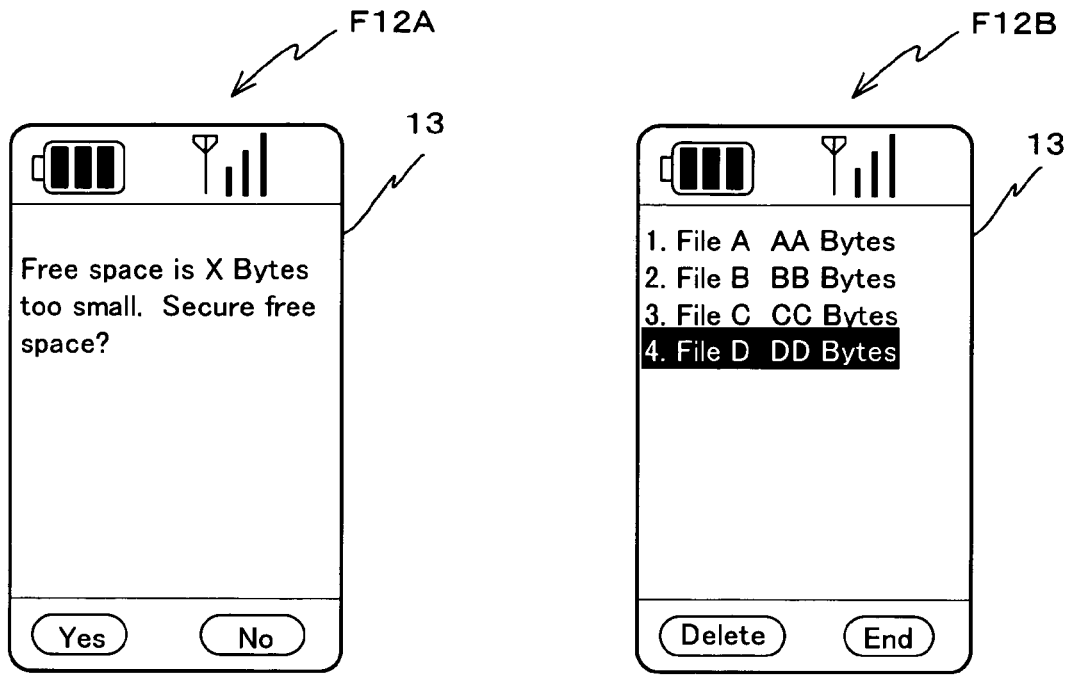
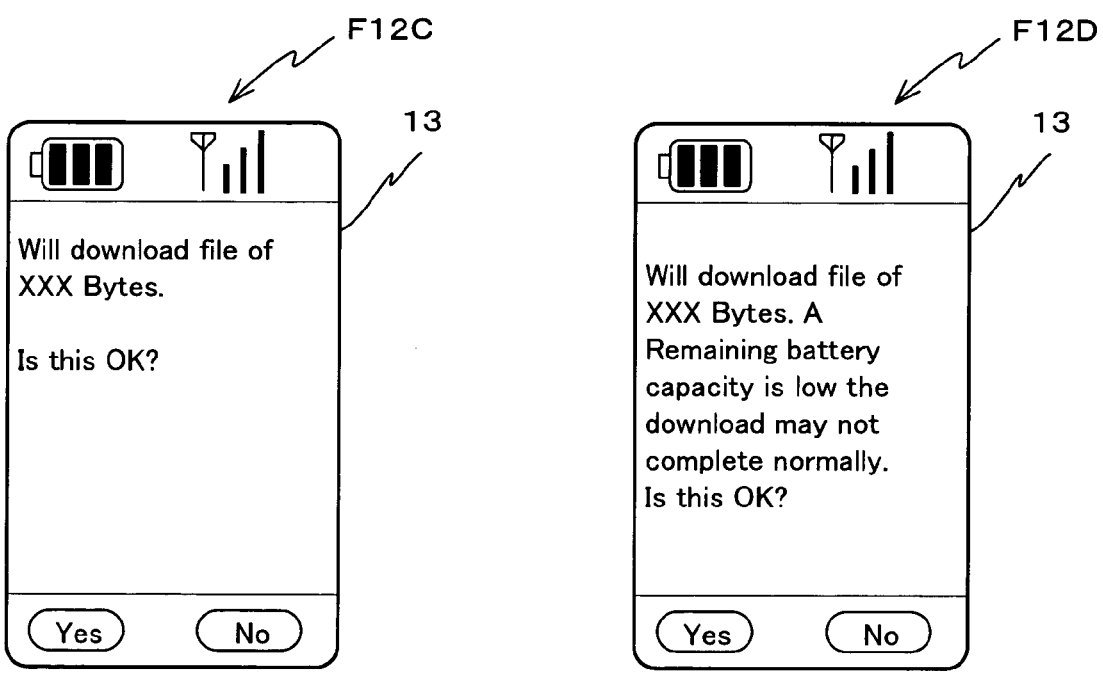

DATA COMMUNICATION METHOD, DATA COMMUNICATION SYSTEM, AND COMMUNICATION TERMINAL

RELATED APPLICATION

This is a continuation application of the international patent application No. PCT/JP2005/002909 filed with application date Feb. 23, 2005.

BACKGROUND OF THE INVENTION

The present invention relates to a data communication method, a data communication system, and a communication terminal, and in more detail relates to a data communication method for downloading data from a server device to a communication terminal, a data communication system using the data communication method, and a communication terminal capable of being used with the data communication system.

BACKGROUND ART

Recently, communication terminals such as mobile communication terminals represented by cellular phones have become widespread. Improvements to functions and performance in such communication terminals has been remarkable, and in addition to a call function and mail transceiving function, which are essential functions of a communication terminal, there is also a function where program data such as a game is downloaded from a server to a mobile communication terminal, and the downloaded program is executed in the communication terminal.

There are also situations where image data, such as still pictures or moving pictures, is downloaded from a server device and the like, and an image relating to the downloaded image data is displayed for appreciation on the communication terminal, or used as wallpaper for a display section. There are also cases where audio data of a melody or a song is downloaded, and the music of the downloaded audio data is appreciated, or used as a ringing tone when a call is received.

In this manner, there are many instances where download of contents data is performed from a server device via a telecommunications network. When downloading contents data via a telecommunications network, contents data that has been downloaded from the server device is stored in a temporary storage region by the communication terminal. This temporary storage region temporarily stores downloaded contents data together with a history. Then, if the saving of contents data is instructed by a user, the contents data is stored in a permanent storage region where stored data is not deleted unless there is an explicit instruction from the user.

Also, history and data to be attached are normally stored in the temporary storage region, which means that by referencing the temporary storage region a previous operating state can be reproduced. It is also possible to reproduce an subsequent operating state after a state where the previous operating state has been reproduced. Note that the history and data to be attached are sequentially stored in the temporary storage region, but in order to store the latest history and data to be attached, when there is insufficient free space in the temporary storage region, history and attached data that are stored are deleted in order of oldest first.

Also, even if an information terminal is a mobile communication terminal, such as a mobile phone, contents data download is often carried out from a server device via a mobile communication network. With download of contents data via a mobile communication network, a packet communication system of circuit switching communication system is used. Which of these communication systems is used to execute download is generally fixedly determined for each mobile communication terminal, or determined using the area where each mobile terminal is.

SUMMARY OF THE INVENTION

Problems to be Solved by the Invention

Contents prepared in the server device for the above described mobile communication terminal tends to have an increased data amount with complexity of the content. For this reason, when contents data is downloaded with the method of the prior art, when the contents data is large it will often arise that there is insufficient free space in the permanent storage region for final storing in order to exploit that contents data. In this type of case, in a state where contents data have been stored in the temporary storage region, the downloaded data is stored in the temporary storage region after data having a low priority in the temporary storage region has been deleted, as a result of an explicit instruction by the user. However, when the priority level of contents data stored in the temporary storage section is the lowest, time for spending a download operation to get the contents data has been wasted, even if it takes long time.

Also, when contents data download is carried out with the prior method, the contents data are generally stored in the temporary storage region. However, when the contents data are large the number of types history and attached data becomes extremely small. For avoiding this, it has been considered to make the temporary storage region large, but in this case the scale of the device structure is inevitably large. Also, since downloading of large contents data is not carried out frequently, the majority of the time, this invites a situation where a large block of free region arises within the temporary storage region.

Also, even in the case where a communication terminal is a mobile communication terminal such as a cellular phone, contents prepared in the server device for the above described mobile communication terminal tends to have an increased data amount with complexity of the content. On the other hand, a variety of the contents usable for the mobile communication terminals have accumulated from before, and the data amount of this contents may not be too large.

However, in downloading contents data via a mobile communication network for a mobile communication terminal, the above described packet communication system or circuit switching communication system is used. Of these systems, the packet switching system has a rate at which circuits can be used in packet communication using a special mobile communication terminal stochastically determined according to a degree of contention with packet communication by other devices. For this reason, usage efficiency of circuits is generally improved, but when contents data are downloaded using a packet communication system by a special mobile communication terminal, the time required for that is also stochastically determined.

As a result, download of contents data using a packet communication system can normally be completed in a short time that is not an unreasonable amount of time for the user to wait in the case where the amount of contents data is small. However, when the amount of contents data is large, there is a possibility that an extremely long time will be required for download of contents data.

On the other hand, with the circuit switching communication system, since it is possible for a special mobile communication terminal to use a single circuit exclusively, there is no contention with communication due to other devices. For this reason, when contents data are downloaded using a packet communication system by a special mobile communication terminal, the time required for that is determined more or less deterministically.

As a result, download of contents data using a circuit switching communication method can be completed in a time that is determined more or less deterministically, when the amount of contents data is large, and there is also no lowering of circuit usage rate. However, when the amount of contents data is small, a proportion of time that the circuit can not be used by other devices becomes high compared to usage time of a circuit by the special mobile communication terminal, which invites lowering of circuit usage efficiency.

The present invention has been conceived in view of the above described situation, and an object of the present invention is to provide a data communication method and data communication system that can improve user convenience, when downloading contents to a communication terminal, by the communication terminal downloading the contents in a state where a receive environment has been appropriately adjusted according to the size of contents.

Another object of the present invention is to provide a mobile communication terminal that can be used with a data communication system of the present invention.

Means of Solving the Problems

A first aspect of the present invention is directed to a data communication method, for downloading data to a communication terminal, comprising: an object data management information request step, where the communication terminal transmits a request for object data management information, including size information for the object data to be downloaded; an object data management information receiving step where the communication terminal receives the object data management information; a data receive environment adjustment step, where the communication terminal adjusts an environment for receiving the object data, based on size information for the object data; a download request step, where the communication terminal transits a download request for the object data; and an object data receiving step where the communication terminal receives the object data.

With this data communication method, first of all, in an object data management information request step, the communication terminal transmits a request for object data management information, including size information for the object data wanting to be downloaded. An object data management information server device that receives this request transmits the object data management information to the communication terminal. In this manner, the object data management information transmitted from the object data management information server device is received by the communication terminal in an object data management information receiving step.

Next, in the data receive environment adjustment step, the communication terminal that has received the object data management information adjusts the environment for receiving the object data based on object data size information. To adjust the environment for receiving the object data, it is possible, for example, to determine a communication system for receipt, or to secure a storage region for storing object data that has been received.

Next, in the download request step, the communication terminal transmits an object data download request. An object data server device receiving this download request (it may be the same or different from the object data management information server device) transmits the object data to the communication terminal. The object data information transmitted from the object data server device is received by the communication terminal in the object data receiving step in an adjusted receive environment.

As a result, at the time of object data download, download is carried out appropriately according to the size of the object data. Therefore, according to the data communication method of the present invention it is possible to improve user convenience, when downloading contents to a communication terminal, by the communication terminal downloading the contents in a state where a receive environment has been optimized according to the size of contents.

With the data communication method of the present invention, it is possible for the data receive environment adjustment step to be provided with a data communication system determination step for determining a data communication system used in downloading the object data, based on the size information for the object data, and in the download request step, the communication terminal designates the determined communication system to transmit the object data download request.

In this case, in the data communication determination step, the communication terminal that has received the object data management information determines a data communication system used for downloading the object data, based on object data size information contained in the object data management information. At the time of the determination, circuit usage rate and download time are measured, and data determination system is determined taking these into consideration. In the download request step, the communication terminal designates the determined data communication system and transmits the object data download request.

As a result, at the time of object data download, download is carried out using an appropriate communication system according to the size of the object data. Accordingly, it is possible to complete download of object data within a reasonable time without inviting lowering of circuit usage efficiency.

Here, in the data communication system determination step, when the size of the object data is less than a specified size, it is possible for the data communication system to be determined to be a packet communication system, while when the size of the object data is the specified size or greater the data communication system is determined to be a circuit switching communication system. In this case, because the packet communication system and the circuit switching communication system have the above described properties, there is no danger of reduction in circuit usage rates, whether the object data amount is large or small, and it is possible to complete download of object data within a reasonable time.

In the event that communication system is determined according to the size of the object data, it is also possible to further provide a download request conformation step where the communication terminal having received the object data management information displays the object data size, and entrusts determination as to whether or not the download request step is executed to a user of the communication terminal. In this case, it is possible for the user to look at the object data size, and take into consideration estimated download time and time margin for download at hat point in time to determine whether or not to execute download of object data at that point in time.

Here, in the download request confirmation step, it is possible for operating power remaining amount capable of being supplied by a power supply of the communication terminal to be detected, and when it is determined that the detected operating power remaining amount can not be said to be a sufficient margin for an object data download operation, display advising the user of the mobile communication terminal to take care is carried out. In this case, it is possible for the user to judge whether to execute download being prepared for non-completion of the download due to insufficient electrical power, or to execute download after securing sufficient electrical power. As a result, it is possible to prevent failure of a download due to insufficient electrical power for an operation that a user is not anticipating, before it happens.

With the data communication method of the present invention, it is possible for the data receive environment adjustment step to be further provided with a free space size determination step where the communication terminal that has received the object data management information determines whether or not the size of free space size in a region used for download by the communication terminal is larger than the object data size, and the download request step is executed if a determination result of the free space determination step is affirmative.

In this case, the communication terminal that has received object data management information determines whether or not there is free space for storing the object data in a permanent storage region where storage data is not deleted unless there is an explicit command from the user, based on the object data size information in a free space determination step. If this determination is affirmative, the communication terminal transmits an object data download request.

As a result, object data is not stored in the temporary storage region, but stored in the permanent storage region, which means that it is possible to save a history of an appropriate number of operations in the temporary storage region without having to prepare a large temporary storage region, and unnecessary download operations are not carried out. Accordingly, it is possible to prevent the situation where object data is downloaded but it is impossible to store.

Here, it is possible for the data receive environment adjustment step to further comprise a free space size securement suggestion step, where if the determination is negative in the free space size determination step, securing the size of the free space to greater than or equal to the size of the object data is suggested to the user of the communication terminal.

In this case, when determination is negative in the free space size determination step, securing the size of the free space to greater than or equal to the size of the object data is suggested to the user of the communication terminal in a free space size securement suggestion step. As a result, it is possible for the user to determine whether or not it is necessary to secure a storage region for the object data before download.

In the case of determining the free space size, it is also possible to further provide a download request confirmation step, where the communication terminal having received the object data management information displays the object data size, and entrusts determination as to whether or not the download request step is executed to the user of the communication terminal. In this case, it is possible for the user to look at the object data size, and take into consideration estimated download time and time margin for download at that point in time to determine whether or not to execute download of object data at that point in time.

With the data communication method of the present invention, it is also possible for data type information for the object data to be included in the object data management information. In this case, it is possible to carry out various processing taking into consideration the convenience to the user, by referring to the data type information or the object data.

It is also possible, for example, in the event that data type information within the object data management information is not of a type the communication terminal is expecting, to display an error, and suspend an operation for downloading the object data. In this case, it is possible to suspend download of data of a type that cannot be utilized.

It is also possible for the object data to comprise data type information in a header section, and for the communication terminal to compare data type information in the object data management information with data type information in the object data, and in the event that they do not match perform an error display. In this case, it is possible for the user to know that downloaded data is not of an expected type and that it was not proper object data.

With the data communication method of the present invention, it is also possible for the communication terminal to compare object data size information in the object data management information with size of the object data downloaded, and in the event that they do not match, error indication is carried put. In this case, it is possible for the user to know that downloaded data is not of an expected size and that it was not proper object data.

With the data communication method of the present invention, it is possible to further provide steps of requesting a remaining portion download, wherein, the communication terminal requests download for a remaining portion, which is a portion after the portion that has already been downloaded, when download of the object data in the object data receiving step was not completed, and receiving a remaining portion wherein the communication terminal receives the remaining portion.

In this case, when an object data download operation terminates directly without the object data download being complete, due to a timeout or circuit failure, the communication terminal executes a remaining portion download request, which is a download request relating to a remaining portion, which is a portion after the portion that has already been downloaded, in a remaining portion download request step. An object data server device that receives this request transmits the remaining portion of the object data to the communication terminal. In this manner, the remaining portion of the object data transmitted from the object data server device is received by the communication terminal in a remaining portion receiving step. For this reason, even when object data downloading is terminated mid way through, download of only the portion remaining at the time the previous download operation terminates is carried out without performing downloading all of the object data again. Accordingly, it is possible to perform efficient download of object data.

A second aspect of the present invention is directed to data communication system, for downloading data to a communication terminal, the communication terminal comprising: object data management information request means, for requesting for object data management information, comprising size information for the object data wanting to be downloaded; object data management information receive means for receiving the object data management information; data receive environment adjustment means, for adjusting an environment for receiving the object data, based on size information for the object data inside the object data management information returned in response to the object data management information request; and download means for performing download control of the object data.

With this data communication system, the object data management information request means of the communication terminal transmits a request for object data management information, comprising size information for the object data wanting to be downloaded. The data receive environment adjustment means adjusts an environment for receiving the object data, based on size information inside the object data management information returned in response to this request.

Continuing on, the download means of the communication terminal transmits an object data download request. Object data returned in response to this download request is then received by the download means.

Specifically, with the data communication system of the present invention, it is possible to download object data to the communication terminal using the above described data communication method of the present invention. Therefore, according to the data communication system of the present invention, it is possible to improve user convenience, when downloading contents to a communication terminal, by downloading the contents in a state where a receive environment has been appropriately adjusted according to the size of contents, by means of the communication terminal.

With the data communication terminal of the present invention, it is possible to further comprise a management information server for transmitting the object data management information to the communication terminal in response to the object data management information request, and an object data server for transmitting the object data to the communication terminal in response to the download request, using the determined communication system.

In this case, it is possible to (i) make the management information server and the object data server the same device, or (ii) make the management information server and the object data server different devices. Note that the management information server and the object data server are made different devices, it is necessary for location position information for the object data server device to be further included in the object data management information.

Also, with the data communication method of the present invention, it is possible to make the communication terminal a mobile communication terminal. In this case, it is possible to improve convenience to a user, with respect to the mobile communication terminal of a simple structure, and to download object data.

A third aspect of the present invention is directed to a communication terminal, comprising object data management information request means, for requesting object data management information, including size information for the object data to be downloaded, an object data management information receiving step for receiving the object data management information, data receive environment adjustment means, for adjusting an environment for receiving the object data, based on size information for the object data inside the object data management information returned in response to the object data management information request and download means for performing download control of the object data.

With this communication terminal, the object data management information request means transmits a request for object data management information, comprising size information for the object data wanting to be downloaded. The data receive environment adjustment means adjusts an environment for receiving the object data, based on size information inside the object data management information returned in response to this request. The download means then transmits an object data download request. Object data returned in response to this download request is then received by the download means.

Specifically, by adopting the communication terminal of the present invention as a communication terminal in the above described data communication system, when downloading contents using the data communication method of the present invention it is possible to download the contents in a state where a receive environment has been appropriately adjusted according to the size of contents. Therefore, a mobile communication terminal of the present invention can be suitably used with a data communication system of the present invention.

With the data communication terminal of the present invention, it is possible for the data receive environment adjustment means to be provided with data communication system determination means for determining a data communication system used in downloading the object data, based on the size information for the object data. In this case, the data communication system used in downloading the object data is determined by the data communication system determination means based on size information within the object data management information. Continuing on, the download means designates the determined data communication system and transmits an object data download request. Accordingly, it is possible to complete download of object data within a reasonable time without inviting lowering of circuit usage efficiency.

In this case, it is possible to have a configuration where when the size of the object data is less than a specified size, the data communication system determination means determines the data communication system to be a packet communication system, while when the size of the object data is the specified size or greater determines the data communication system to be a circuit switching communication system. In this case, because the packet communication system and the circuit switching communication system have the above-described properties, there is no danger of reduction in circuit usage rates, whether the object data amount is large or small, and it is possible to complete download of object data within a reasonable time.

Also, in the event that data communication system determination means is provided, it is possible to have a configuration where the download means displays object data size before transmission of a download request, and entrusts determination as to whether or not the object data download request is executed to a user. In this case, it is possible for the user to look at the object data size, and take into consideration estimated download time and time margin for downloading at that point in time to determine whether or not to execute download of object data at that point in time.

In this case, it is possible to have a configuration where the download means detects operating power remaining amount capable of being supplied by a power supply before transmission of the download request. When it is determined that the detected operating power remaining amount is not a sufficient margin for an object data download operation, display advising caution to the user is carried out. In this case, it is possible for the user to judge whether to execute download being prepared for non-completion of the download due to insufficient electrical power, or to execute download after securing sufficient electrical power, by looking at the caution display relating to operating power remaining amount displayed by the download means. As a result, it is possible to prevent failure of a download due to insufficient electrical power for an operation that a user is not anticipating, before it happens.

With the communication terminal of the present invention, it is possible to have a configuration where the data receive environment adjustment means comprises free space determination means for determining whether or not there is free space for storing the object data in a permanent storage region where storage data is not deleted unless there is an explicit command from the user, based on the object data size information, and when the determination result by the free space determination means is affirmative, the download means transmits the object data download request, and receives object data returned in response to the download request. In this case, the free space determination means determines whether or not there is free space for storing the object data in a permanent storage region where storage data is not deleted unless there is an explicit command from the user, based on size information within the object data management information. In the event that this determination is affirmative, the download means transmits an object data download request, and receives object data returned in response to this download request. Accordingly, it is possible to prevent the situation where object data is downloaded but it is impossible to store.

In this case, it is possible to have a configuration where when the determination result is negative, the free space determination means suggests securement of the free space size of greater than or equal to the object data size to the user. In this case, it is possible for the user to determine whether or not it is necessary to secure a storage region for the object data before download of the object data by looking at the free space size suggestion display displayed by the free space determination means.

In the event that free space determination means is provided also, it is possible to have a configuration where the download means displays object data size before transmission of a download request, and entrusts determination as to whether or not the object data download request is executed to a user. In this case, it is possible for the user to look at the object data size displayed by the download means, and take into consideration estimated download time and time margin for download at that point in time to determine whether or not to execute download of object data at that point in time.

With the communication terminal of the present invention, it is also possible to have a structure where the permanent storage region is a region divided for each data type, and data type information for the object data is further included in the object data management information. In this case, it is possible to store object data in divided regions (folders for data type etc.) within the permanent storage region according to data type of the object data.

With the communication terminal of the present invention, it is also possible to have a structure where, when download of the object data is not completed, the download means performs a remaining portion download request for a remaining portion, being a portion other than the portion that has already been downloaded, to the server device. In this case, even when object data download is terminated mid way through, it is possible to carry out download of only the portion remaining at the time the previous download operation terminates without performing downloading all of the object data again. Accordingly, it is possible to perform efficient download of object data.

Effects of the Invention

As has been described above, according to the data communication method and data communication system of the present invention, the effect is achieved of improving user convenience, when downloading contents to a communication terminal, by the communication terminal downloading the contents in a state where a receiving environment has been appropriately adjusted according to the size of contents.

Also, a mobile communication terminal of the present invention has the effect that it can be used with a data communication system of the present invention.

BRIEF DESCRIPTION OF THE DRAWINGS

FIG. 12 is a flowchart for explaining a display example for the process in FIG. 11;

DETAILED DESCRIPTION

One embodiment of the present invention will be described with reference to FIG. 1-FIG. 14. In these drawings, elements that are the same or equivalent have the same reference numbers assigned, and repeat description will be omitted.

Figure 1:
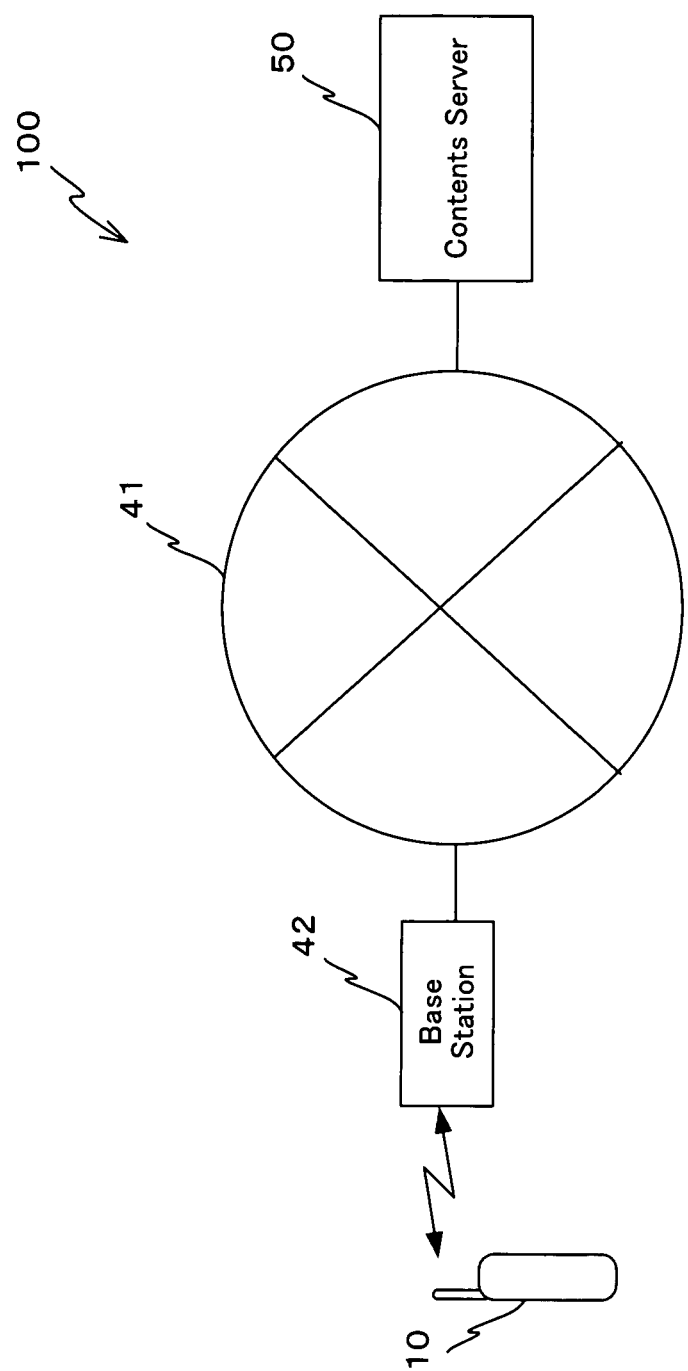
FIG. 1 is a block diagram schematically showing the structure of a data communication system of one embodiment of the present invention.

The structure of a data communication system 100 of one embodiment of the present invention is schematically shown in FIG. 1. As shown in FIG. 1, this data communication system 100 comprises (a) a portable telephone unit 10, (b) a communication network 41 connecting the portable telephone unit 10 via a base station 42 that carries out wireless communication with the portable telephone 10, and (c) a contents server 50 connected to the communication network 41. In this case, the number of portable telephone units and the number of base stations is generally a lot, but in FIG. 1 one portable telephone unit 10 and one base station 42 are shown as an example.

Figure 2B:
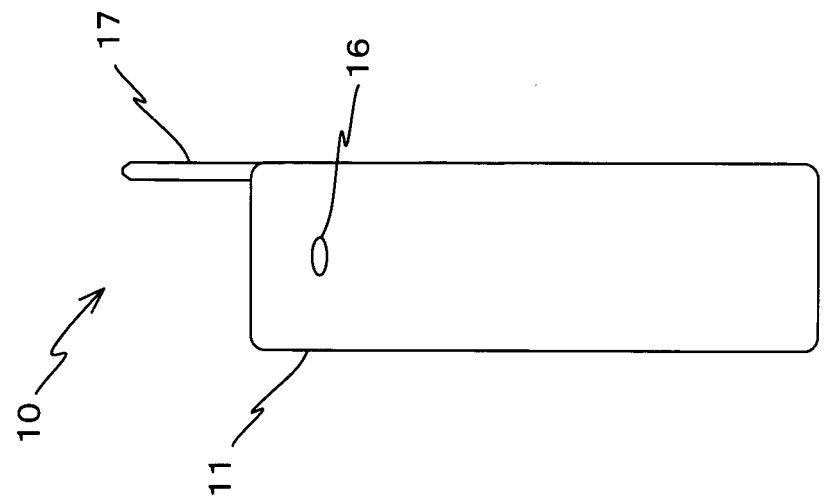
FIG. 2B schematically shows the external appearance of the rear of the cellular phone of FIG. 1.
Figure 2A:
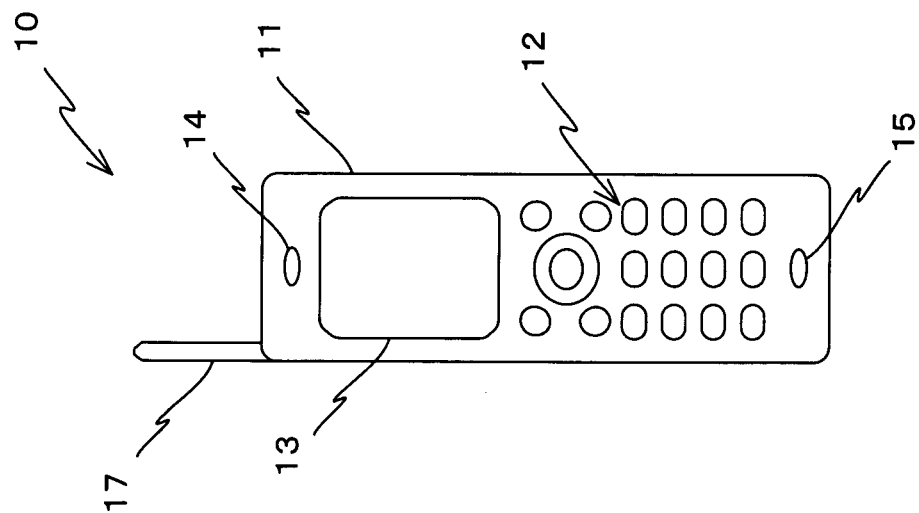
FIG. 2A schematically shows the external appearance of a front side of a cellular phone of FIG. 1.

The external structure of the portable telephone unit 10 is schematically shown in FIG. 2A and FIG. 2B. As shown comprehensively in FIG. 2A and FIG. 2B, the portable telephone unit 10 is comprised of (a) a portable telephone body 11 (refer to FIG. 3) provided with a control section 21 which will be described later, (b) an operating section 12 having a numeric key pad for input of telephone numbers and function keys for inputting various commands such as operation mode switching, to the control section 21, and (c) a display section 13 having a liquid crystal display for displaying operation guidance, operating status, received messages etc. in response to commands from the control section 12. The portable telephone 10 is also comprised of (d) a call speaker 14 for reproducing voice signals transmitted from a calling party at the time of a call, (e) a microphone for inputting sounds at the time of sound collection and inputting voice at the time of a call, and (f) a guidance speaker for generating ring alerts and guidance voice in response to commands from the control section 21. The portable telephone unit 10 is further comprised of (g) an antenna 17 for transceiving wireless signals between the unit and a base station.

Figure 3:
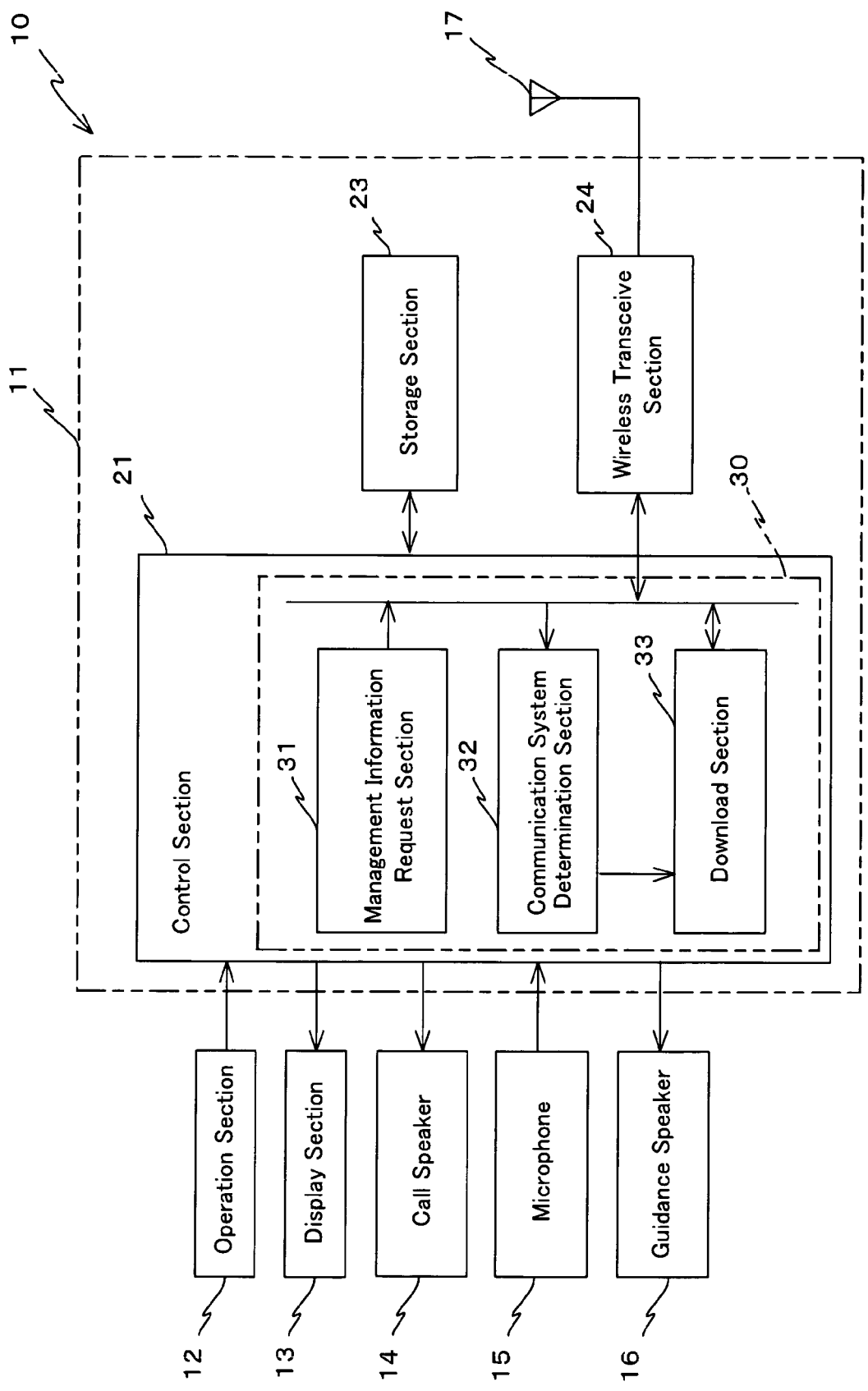
FIG. 3 is functional block diagram for describing the internal structure of the cellular phone of FIG. 2.

In this case, as shown in FIG. 3, the portable telephone body 11 is comprised internally of (i) a control section 21 for unified control of overall operation of the portable telephone body 11, (ii) a storage section 23 formed of read only memory (ROM) and random access memory (RAM), and (iii) a wireless transceiver section 24 for performing communication between the portable telephone unit and a base station 42.

The control section 21 has central processing unit (CPU) and digital signal processor (DSP), constituting a processing unit for executing programs. With this control section 21, various programs are executed, starting with a data communication program 30 for downloading contents data.

The data communication program 30 comprises (i) a management information request section 31 for transmitting a management information request relating to contents data to be downloaded, to the contents server 50, (ii) a communication system determination section 32 for determining a communication system used for download of the object data, based on size information of the object data within management information returned from a server in response to a management information request, and (iii) a downloading section for issuing a download request for contents data and receiving downloaded contents data, and bringing various cautions to the attention of a user when downloading. The contents data management information will be described later.

Figure 4A:
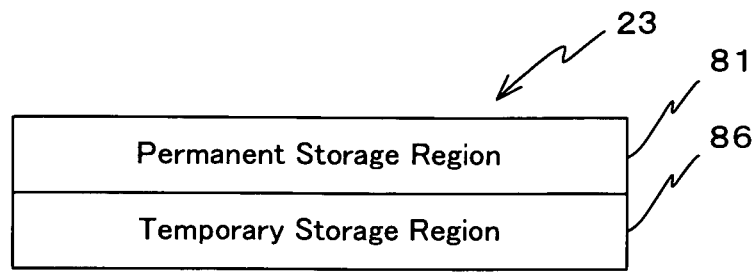
FIG. 4A is drawing for describing the internal structure of storage section in FIG. 3.
Figure 4B:
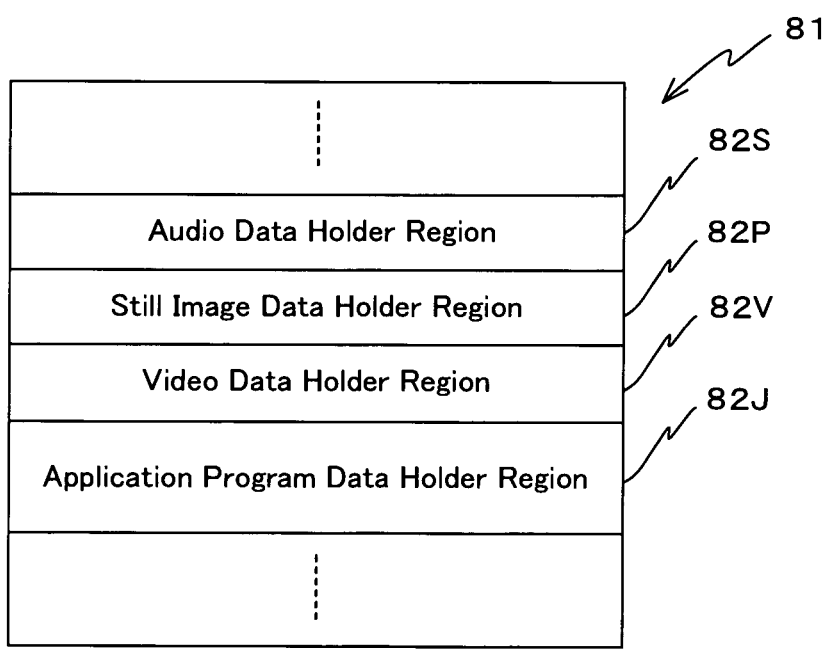
FIG. 4B is drawing for describing the structure of permanent storage region in FIG. 4A.

As shown in FIG. 4A, the storage section 23 has a permanent storage region 81 that perpetuates storage data unless there is an explicit delete instruction from the user, and a temporary storage region 86 for temporarily holding storage data. In this case, as shown in FIG. 4B, the permanent storage region 81 comprises an audio data holder region 82S, a static image data holder region 82P, a video data holder 82V, an application program data holder area 82J and so forth. Downloaded contents data is stored in a region that corresponds to its data type.

Figure 4C:
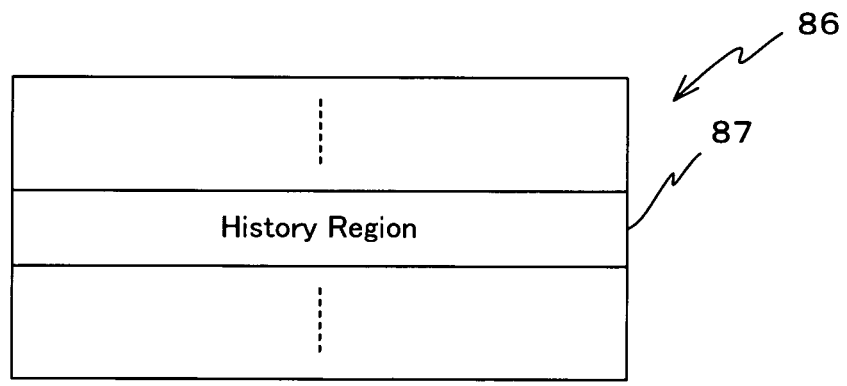
FIG. 4C is drawing for describing the structure of temporary storage region in FIG. 4A.

Also, as shown in FIG. 4C, the temporary storage region 86 is capable of securing a history region 87. An operation history for execution applications etc. is temporarily stored in this history region 87, and by referring to the history in the history region 87 it becomes possible for a user to access screens for a previous operation, for example. Note that, in the event the amount of history information exceeds a data amount that can be stored in the history region 87, old history information is automatically deleted. Also, when execution of an application has been completed, a history region secured by that application is freed up.

Figure 5:
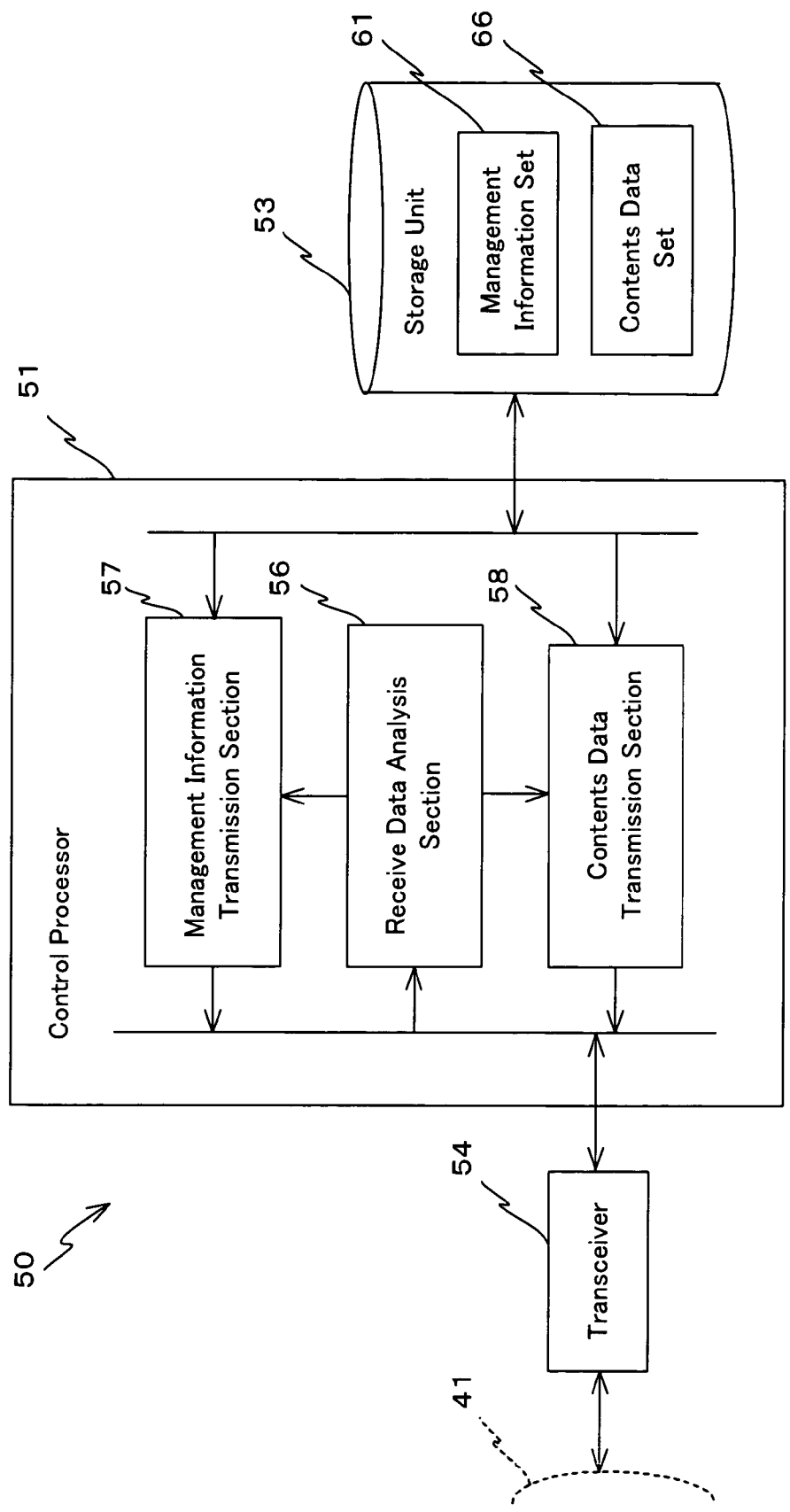
FIG. 5 schematically is a structural block diagram schematically showing the structure of a contents server of FIG. 1.

As shown in FIG. 5, the contents server 50 comprises (a) a control processor 51 for unified control of all operation of the contents server 50, (b) a storage unit 53 for storing various data such as management information storage sets 61 and contents data sets 66, and (c) a transceiver unit 54 for carrying out communication via a communication network 41. In this case, the control processing unit 51 comprises (i) a receive data analysis section 56 for analyzing data that has been input via the transceiver unit 54, (ii) a management information transmission section 57 for transmitting requested management information to a device generating a management information request, according to a response to a management information request, and (iii) a contents data transmission section 58 for transmitting contents data to the device that generated a download request, in response to the download request.

Figure 6A:
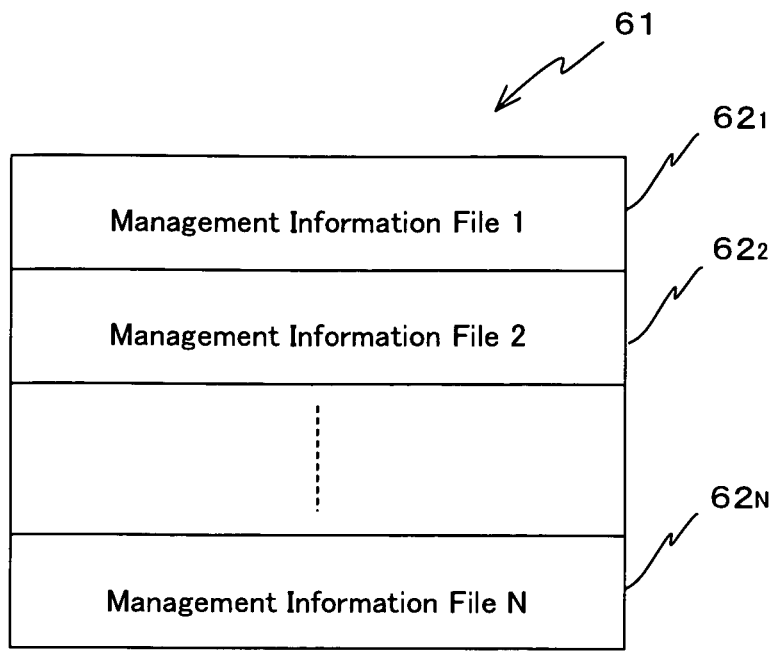
FIG. 6A is drawing for describing the structure of management information in FIG. 5.
Figure 6B:
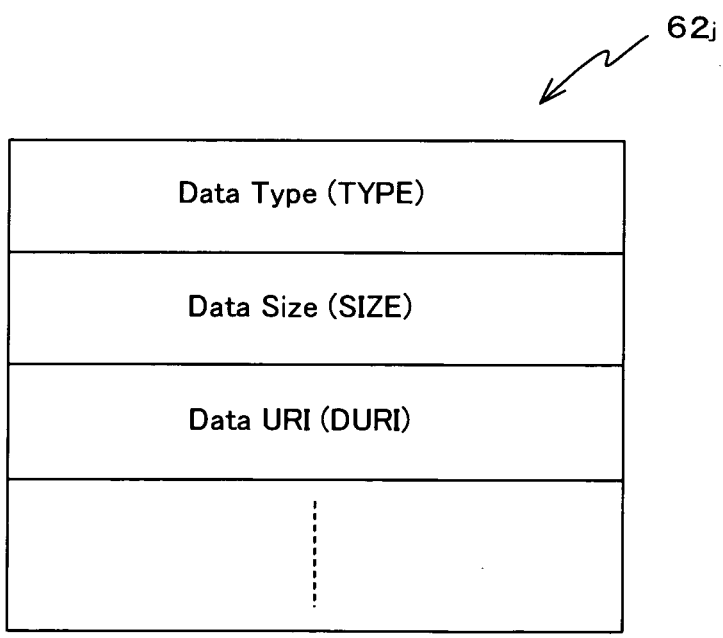
FIG. 6B is drawing for describing the structure of management file in FIG. 6A.

As shown in FIG. 6A, the management information data set 61 is made up of a plurality of (in this embodiment, N) management information files $62_1$-$62_N$. Then, as shown in FIG. 6B, contents data type (TYPE), contents data size (SIZE), contents data URI (Uniform Resource Identifier) (DURI) corresponding to the management information file $62_j$ are described in respective management information files $62_j$ (j=1-N) using XML (eXtensible Markup Language), for example. As well as the above-described Data type (TYPE) data size (SIZE) and data URI (DURI), version information for the management information file $62_j$ is described in the management information file $61_j$.

Figure 7A:
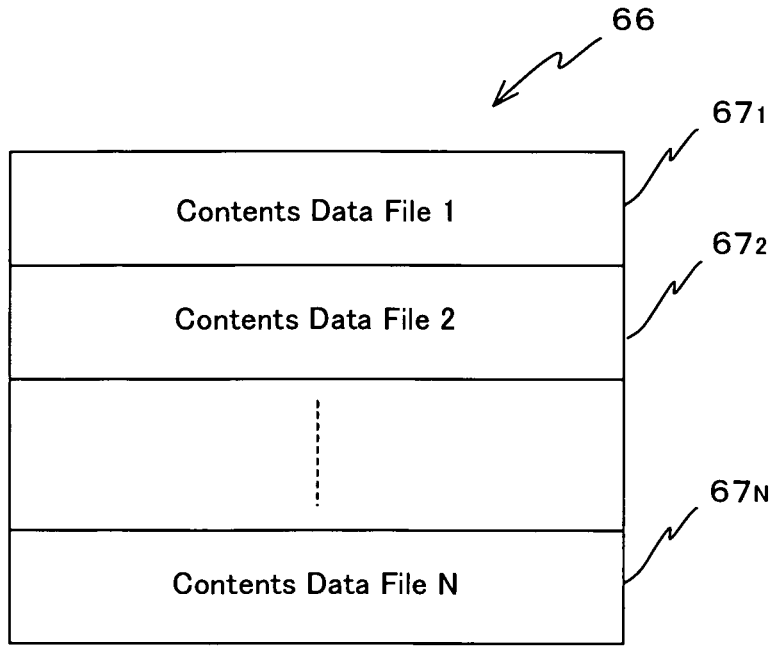
FIG. 7A is drawing for describing the structure of a set of contents data in FIG. 5.

As shown in FIG. 7A, the contents data set 66 is made up of a plurality of (in this embodiment, N) contents data files $67_1$-$67_N$. In this case, each contents data file $67_j$ corresponds to management information file $62_j$.

Figure 7B:
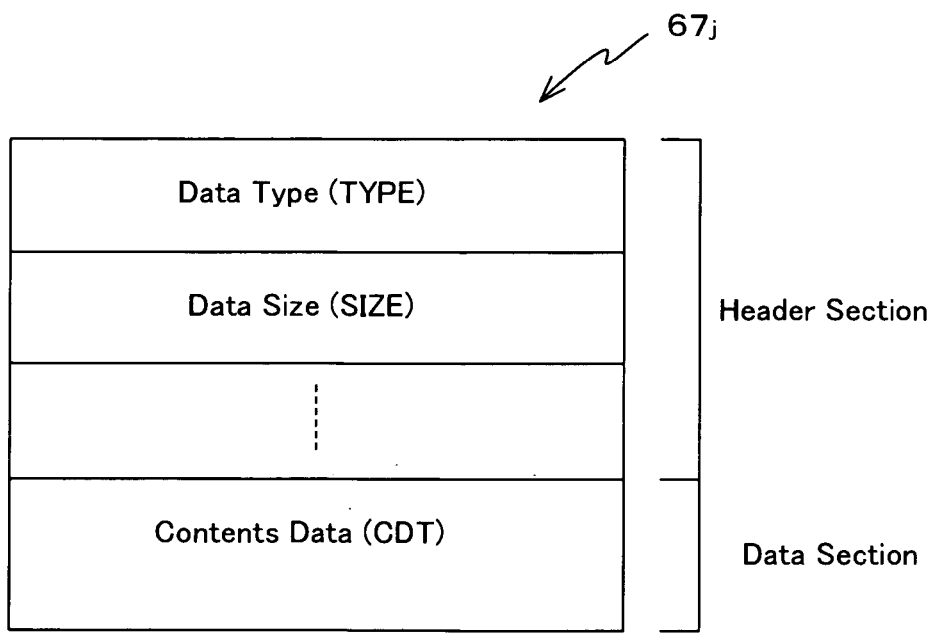
FIG. 7B is drawing for describing the structure of a contents data file in FIG. 7A.

As shown in FIG. 7B, each contents data file $67_j$ (j=1-N) is made up of a header section and a date section. The contents data type (TYPE), contents data size (SIZE) etc. are described in the header section. Also, contents data are stored in the data section.

Next, a download operation for the contents data, of the data communication system 100 described above, will be described with reference mainly to FIG. 8 to FIG. 14, and appropriate other drawings.

Figure 8:
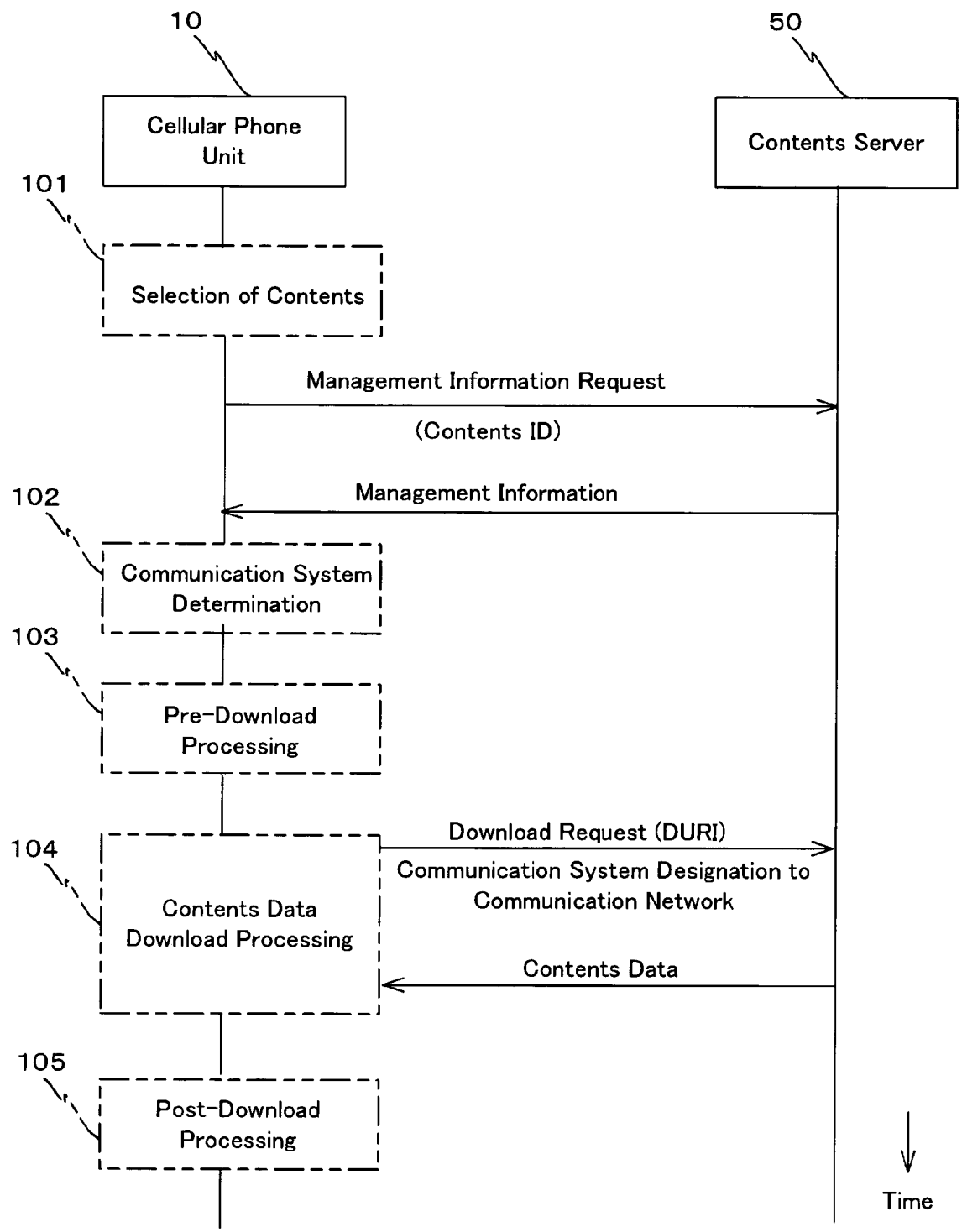
FIG. 8 is a sequence chart for explaining a download operation of the system of FIG. 1.
Figure 9:
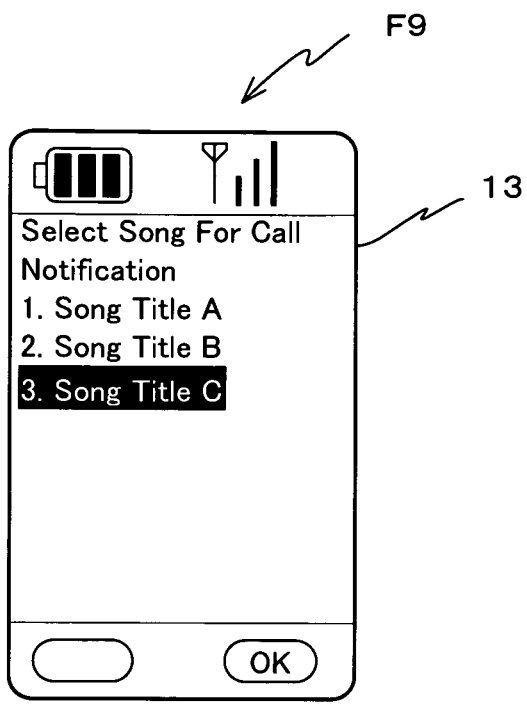
FIG. 9 is a drawing showing a display when selecting contents data in FIG. 8.

First of all, in step 101 of FIG. 8, the user of the portable telephone unit 10 operates the operation section 12 to select contents data to be downloaded. An example of display on the display section 13 at the time of this selection is shown in FIG. 9. With the display example of FIG. 9, an example for selecting a song title for notifying a user of the fact that a call has arrived at the time of receiving a call. Note that, as selected contents data, it is possible to have a melody, image or program etc. for notifying a user of the fact that a call has arrived at the time of receiving a call.

When "decide" in FIG. 9 is selected as a result of contents being selected by the user, that is the user operating the operation section 12, while looking at the display of the contents selection screen in this way, the management information request section 31 transmits a management information request to the contents server 50 via the wireless transceiver section 24, with a contents identifier (ID) (in the case of FIG. 9, an identifier for incoming call notification tine with song title C) as a parameter. Note that, this transmission and transceiving of data afterwards is carried out using a packet communication system until change of communication system is requested from the portable telephone unit. In this case, the contents selection screen is made into history information and stored in the history region 87 together with state information at the time of this display.

Returning to FIG. 8, a management information request transmitted from the portable telephone unit 10 by way of the base station 42 and the communication network 41 reaches the contents server 50. In the contents server 50, the receive data analysis section 56 receives the management information request via the transceiver unit 54. In this way, the receive data analysis unit 56 that has received the management information request analyses the receive data, and when the receive data is a management information request notifies the fact that a management information request has been received and a contents identifier to the management information transmission section 57.

The management information transmission section 57 that has received notification of the fact that a management information request has been received and a contents identifier reads out management information file $62_k$ (k is a single value from 1 to N determined according to a notified URI) corresponding to the notified contents identifier from within a management information data set 61 inside the storage section 53. Then, the management information transmission section 57 transmits contents of the read out management information file $62_k$ to the portable telephone unit 10 via the transceiver section 54, as management information corresponding to the contents identifier.

Management information transmitted from the contents server 50 by way of the communication network 41 and the base station 42 reaches the portable telephone unit 10. In the portable telephone unit 10, the communication system determination section 32 receives management information via the wireless transceiver section 24. In this way, the communication system determination section 32 that has received the management information determines the communication system in step 102.

Figure 10:
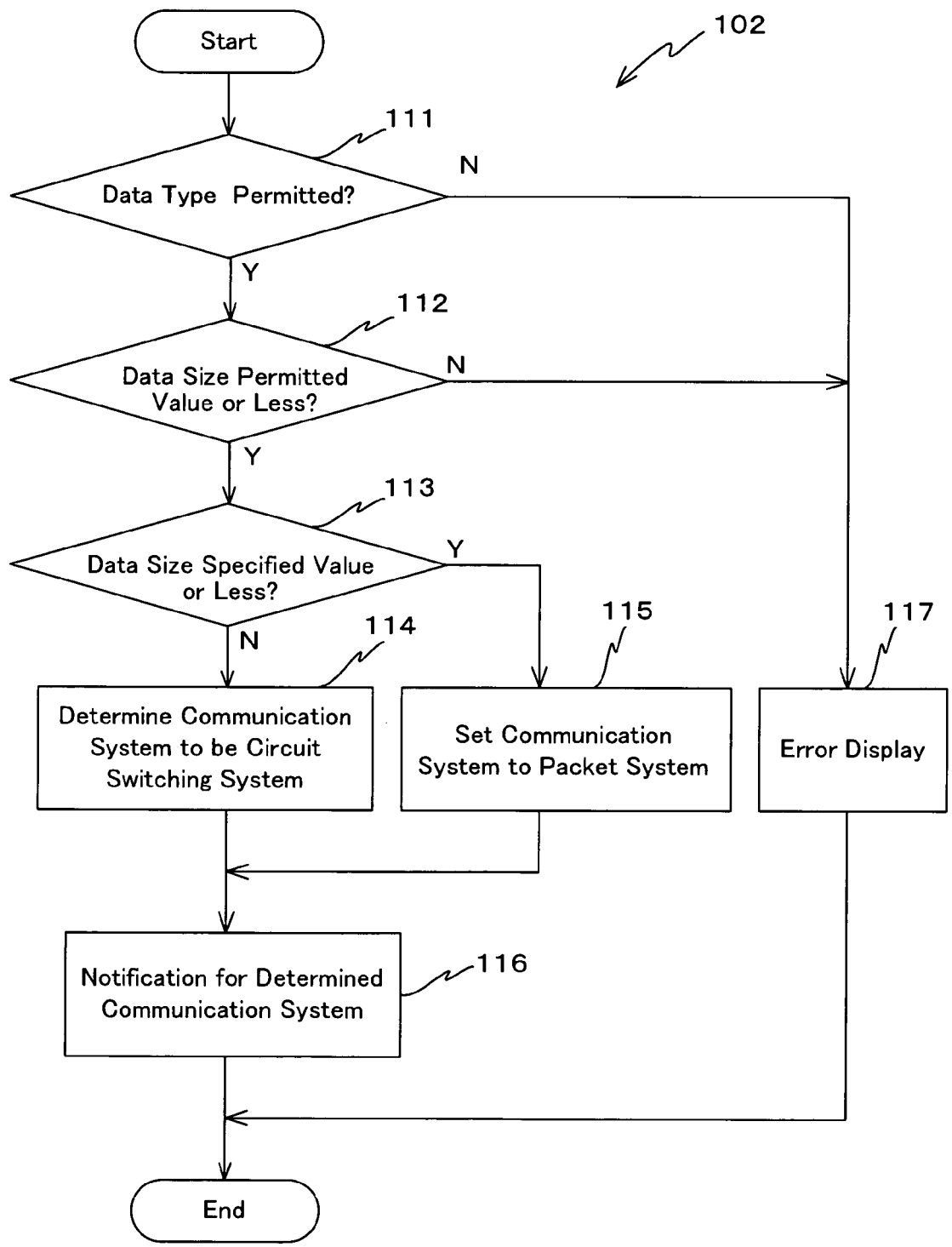
FIG. 10 is a flowchart for explaining a communication system determination process in FIG. 8.
Figure 11:
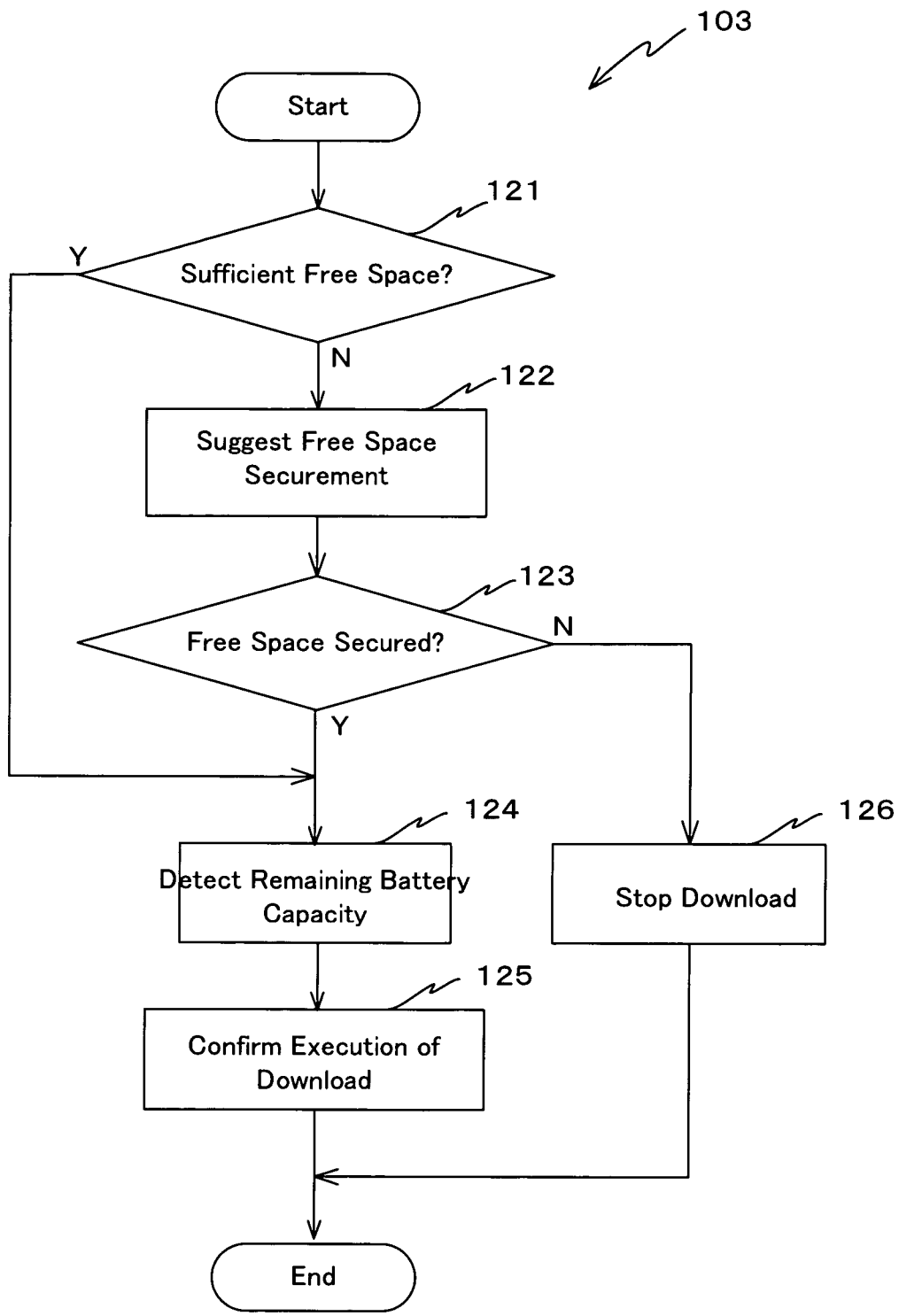
FIG. 11 is a flowchart for explaining a process before download in FIG. 8.

In this step 102, first of all in step 111 of FIG. 10 the communication system determination section 32 determines whether or not the data type (TYPE) in the received management information can be permitted. In the event that this determination is negative, processing transfers to step 117. In step 117, in this case the communication system determination section 32 displays an error message for the fact that the data type within the management information cannot be permitted on the display section 13, and notifies this fact to the user. Processing is then completed and after that download operations are suspended.

On the other hand, in the event the determination in step 111 is affirmative, processing transfers to step 112. In step 112, the communication system determination section 32 determines whether or not the data size (SIZE) within the received management information is less than or equal to a permitted value. In the event that this determination is negative, processing transfers to step 117. In step 117, in this case the communication system determination section 32 displays an error message for the fact that the data size within the management information exceeds a permitted value on the display section 13, and notifies this fact to the user. Processing is then completed and after that download operations are suspended.

On the other hand, in the event the determination in step 112 is affirmative, processing transfers to step 113. In this step 113, the communication system determination section 32 determines whether or not the data size within the received management information is less than or equal to a predetermined value (specified value) value. This specified value is determined using packet communication conditions, such as a threshold for number of packet usable time slots in the portable telephone unit 10. In the event the determination in step 113 is negative, processing transfers to step 114. In this step 114, the communication system determination section 32 determines the download communication system to be a circuit switching communication system.

On the other hand, in the event the determination in step 113 is affirmative, processing transfers to step 115. In this step 115, the communication system determination section 32 determines the download communication system to be a packet communication system.

When the communication system is determined in step 114 or step 115, then in step 116 the communication system determination section 32 notifies the determined communication system and management information to the download section 33. In this way, the processing of step 102 is completed.

Returning to FIG. 8, when the communication system is determined and step 102 is completed, in step 103 the download section 33 carries out pre-download processing. With this step 103, as shown in FIG. 1, first of all in step 121 the download section 33 determines whether or not there is sufficient free space for contents data in the storage section 23. Note that, this determination is carried out taking into consideration the size of the free space region for contents data, data size within the management information, and when required, a region used by a programs executed at the same time. In this case, in the event that there is no need to consider contention relationships between simultaneously executed processes, determination is carried out according to whether or not the size of free space for contents data is greater than or equal to the data size within the management information.

If the determination in step 121 is negative, then in step 122 the download section 33 suggests securement of free space to the user. At the time of this suggestion, a display example to the display section 13 is displayed as the screen F12A in FIG. 12. When during display of this free space securement suggestion screen the fact that securement of free space has not been carried out, that is "no" during the display of the screen F12A is selected by the user operating the operation section 12, processing transfers to step 123.

On the other hand, when during display of this free space securement suggestion screen the fact that securement of free space has been carried out, that is "yes" during the display of the screen F12A is selected by the user operating the operation section 12, a screen for securing free space displayed as the screen F12B, for example, is displayed. The user then deletes deletable files in an attempt to secure free space. When deletion of files that are capable of deletion in order to secure free space is completed, processing is transferred to step 123.

Returning to FIG. 11, in step 123, the download section 33 determines whether or not free space for contents data has been secured. In the event that this determination is negative, processing transfers to step 126. In this step 126, the download section 33 was not able to secure a sufficient size of free space, and so after display indicating that the download operation has been suspended is carried out in the display section the subsequent download operation is terminated.

On the other hand, in the event the determination in step 123 is affirmative, processing transfers to step 124. In this step 124, the download section 33 remaining power supply capacity is detected. Continuing on, in step 125 the download section 33 confirms execution of download. An example of a download execution confirmation screen displayed on the display section 13 at the time of this confirmation is shown as screen F12C and screen F12D. In this case, a display example for the case where there is surplus remaining power supply capacity for the download time estimated from the data size of the contents data is displayed on the screen F12C, and a display example for the case where there is not a surplus remaining power supply capacity is displayed in the screen F12D. In this way, the processing of step 103 is completed.

When not executing download is selected during display of the download conformation screen such as screen F12C or F12D, namely "no" is selected by the user operating the operation section 12 during display of screen F12C and screen F12D, download operations after that are stopped. On the other hand, when download is executed during display of the download confirmation screen, the contents download processing of step 104 in FIG. 8 is started. In this case, the download confirmation screen is made into history information and stored in the history region 87 together with state information at the time of this display.

Figure 13:
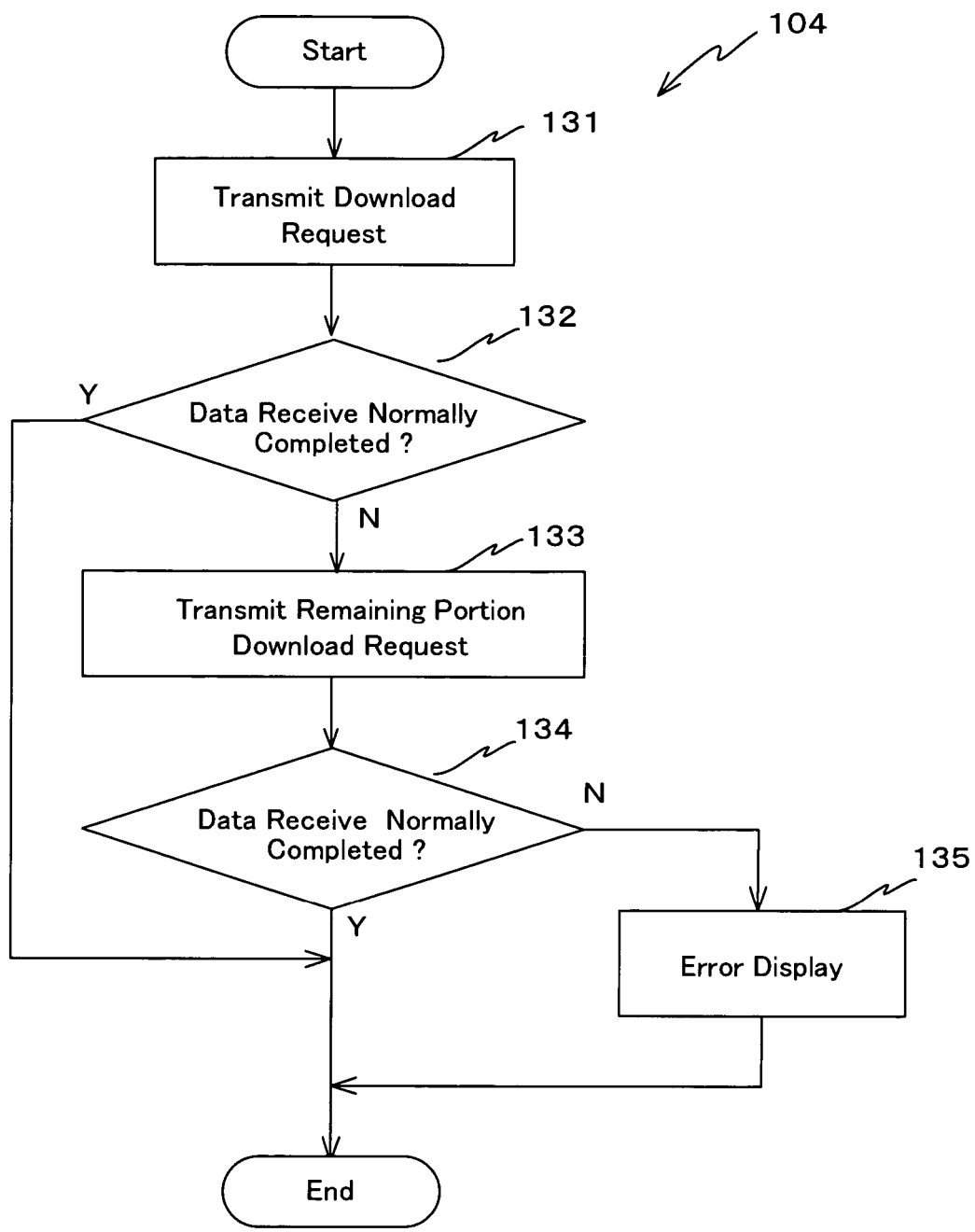
FIG. 13 is a flowchart for explaining a contents data download process in FIG. 8.

In this step 104, as shown in FIG. 13, first of all, in step 131 the download section 33 designates the communication system determined above and transmits a download request to the contents server 50 via the wireless transceiver section 24 with the contents data URI (DURI) as a parameter. After this, data communication is carried out using the determined communication system.

Returning to FIG. 8, a download request transmitted from the portable telephone unit 10 by way of the base station 42 and the communication network 41 reaches the contents server 50. In the contents server 50, the receive data analysis section 56 receives the download request via the transceiver unit 54. In this way, the receive data analysis unit 56 that has received the download request analyses the receive data, and when the receive data is a download request notifies the fact that a download request has been received and the contents data URI to the contents data transmission section 58.

The contents data transmission section 58 that has received notification of the fact that a download request has been received and of the contents data URI reads out a contents data file $67_k$ corresponding to the notified contents data URI from a contents data set 66 inside the storage section 53. Then, the contents data transmission section 58 transmits contents of the read out contents data file $62_k$ to the portable telephone unit 10 via the transceiver section 54.

Contents data transmitted from the contents server 50 by way of the communication network 41 and the base station 42 using the above designated communication system reaches the portable telephone unit 10. With the portable telephone unit 10, the download section 33 receives contents data via the wireless transceiver section 24 and stores in a region inside the permanent storage region 81 corresponding to the data type of the contents data. For example, when the data type is audio data the downloaded contents data is stored in an audio data holder region 82S. A specified animation is displayed on the display section 13 during this receive operation.

Returning to FIG. 13, when the contents data receive operation is completed, in step 132, the download section 33 determines whether or not data receive completed normally. In the event that this determination is affirmative, the processing of step 104 is completed.

On the other hand, in the event that the determination in step 132 is negative due to disconnect of session or timeout etc. occurring, processing transfers to step 133. In this step 133, the download section 33 transmits a remaining portion download request for the remaining portion after the portion that could be downloaded already is transmitted via the wireless transceiver section 24 to the contents server 50 with the contents data URI and the remaining portion location as parameters.

A remaining portion download request transmitted from portable telephone unit 10 by way of the base station 42 and the communication network 41 reaches the contents server 50. In the contents server 50, the receive data analysis section 56 receives the remaining portion download request via the transceiver unit 54. In this way, the receive data analysis unit 56 that has received the remaining portion download request analyses the receive data, and when the receive data is a remaining portion download request notifies the fact that a download request has been received, the contents data URI and the remaining portion location to the management information transmission section 58.

The contents data transmission section 58 that has received notification of the fact that a remaining portion download request has been received and of the contents data URI and remaining portion location reads out a remaining portion in a contents data file $67_k$ corresponding to the notified contents data URI. Then, the contents data transmission section 58 transmits contents of the read out remaining portion to the portable telephone unit 10 via the transceiver section 54.

Remaining portion data transmitted from the contents server 50 by way of the communication network 41 and the base station 42 reaches the portable telephone unit 10. With the portable telephone unit 10, the download section 33 receives remaining portion data via the wireless transceiver section 24 and stores remaining portion data in a region inside the permanent storage region 81 corresponding to the data type of the contents data.

Returning to FIG. 13, when the remaining portion data receive operation is completed, in step 134, the download section 33 determines whether or not data receive operation completed normally. In the event that this determination is affirmative, the processing of step 104 is completed.

On the other hand, in the event the determination in step 134 is negative, processing transfers to step 135. In this step 135, error display for the fact that contents data could not be downloaded is performed, and subsequent download operation are stopped.

Figure 14:
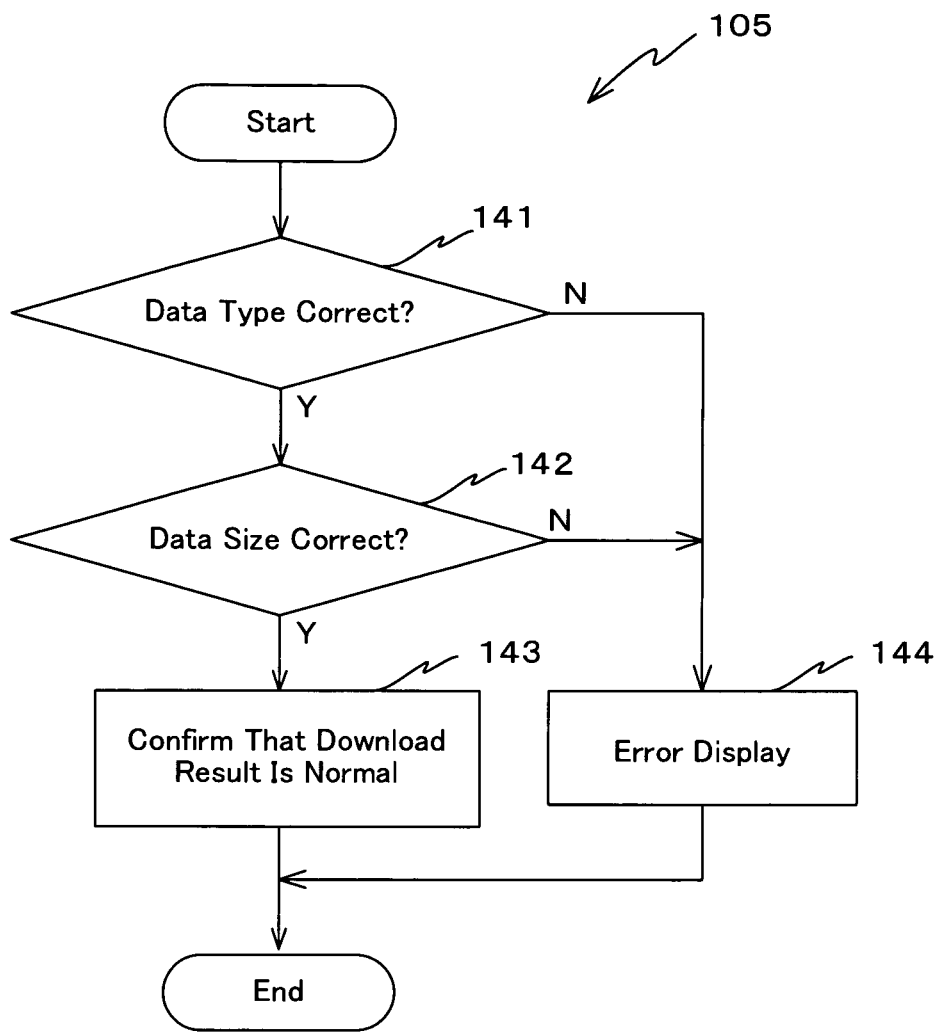
FIG. 14 is a flowchart for explaining a process after download in FIG. 8.

Returning to FIG. 8, when all contents data are received normally, in step 105 the download section 33 carries out post-download processing. In this step 105, as shown in FIG. 14, first of all in step 141 it is determined whether or not the data type of the management information and the data type of the header section of the contents data match. In the event that this determination is negative, processing transfers to step 144. In step 144, in this case, error display for the fact that the data type is invalid is displayed on the display section 13. The download section 33 then deletes received contents data and the processing of step 105 is completed.

On the other hand, in the event the determination in step 141 is affirmative, processing transfers to step 142. This step 142 determines whether or not the data size of the management information and the data size of the header section of the contents data match. In the event that this determination is negative, processing transfers to step 144. In step 144, in this case, error display for the fact that the data size is invalid is displayed on the display section 13. The download section 33 then deletes received contents data and the processing of step 105 is completed.

On the other hand, in the event the determination in step 142 is affirmative, processing transfers to step 143. In this step 143, the download section 33 confirms that downloaded contents data is correct, and indication that the download process has completed normally is displayed on the display section 13. The processing of step 105 is then completed.

A transition to a previous state accompanying access to contents carried out by referencing the history region 87 is carried out in accordance with a user instruction. Furthermore, in the event that an instruction for returning from a state where download is completed normally to a state one before in the history is issued by the user, there is not a transition to the state of displaying the download confirmation screen (refer to screen F12C or screen F12D in FIG. 12) that instructed download execution, but a transition to the state of displaying the previous contents selection screen where the download operation start was requested (refer to FIG. 9).

As has been described above, with this embodiment, first of all the portable telephone unit transmits management information, comprising size information for the contents data wanting to be downloaded. The contents server 50 receiving this request transmits the management information to the portable telephone unit 10. Next, the portable telephone unit 10 that has received the management information determines a data communication system used for downloading the contents data, based on contents data size information contained in the object data management information. Next, the portable telephone unit 10 designates the determined communication system and transmits a download request for the contents data. As a result, a communication system between the portable telephone unit 10 and the contents server 50 becomes the designated communication system. The contents server 50 that has received the download request then transmits contents data using the determined communication system.

Accordingly, according to this embodiment, since an appropriate communication system is selected depending on the data size of the contents data to be downloaded, there is no risk of lowering of data circuit usage rate, and it is possible to complete object data download within a reasonable time.

Also, with this embodiment, the portable telephone unit 10 determines the data communication system to be a packet communication system when the size of the contents data is less than or equal to a specified value, and when the size of the contents data is the specified size or greater determines the data communication system to be a circuit switching communication system. For this reason, utilizing the properties of the packet communication system and the circuit switching communication system, there is no danger of reduction in circuit usage rates, whether the contents data amount is large or small, and it is possible to complete download of object data within a reasonable time.

Also, with this embodiment the portable telephone unit 10 displays the data size (SIZE) within the management information, and determination of whether or not the execute download is entrusted to the user. For this reason, it is possible for the user to look at the object data size displayed by the download means, and take into consideration estimated download time and time margin for download at that point in time to determine whether or not to execute download of contents data at that point in time.

Also, with this embodiment, the portable telephone unit 10 detects operating power remaining amount capable of being supplied by a power supply, and when it is determined that the detected operating power remaining amount is not sufficient for an object data download operation, display advising caution to the user is carried out. For this reason, it is possible for the user to judge whether to execute download being prepared for non-completion of the download due to insufficient electrical power, or to execute download after securing sufficient electrical power. As a result, it is possible to prevent failure of a download due to insufficient electrical power for an operation that a user is not anticipating, before it happens.

Also, with this embodiment, the portable telephone unit 10 determines whether or not the size of free space of a download region is larger than the size of the contents data, and when this determination is negative suggests securement of the size of the free space to greater than or equal to the size of the contents data to the user. Therefore, since it is possible to secure a storage region for the contents data before download it is possible for the user to avoid an unexpected situation where download is performed but could not be stored in a specified folder Also, with this embodiment, data type information for the contents data is further included in the management information, and when the data type information inside the management information is not as expected the portable telephone unit 10 displays an error and stops operations for download. Therefore, it is possible to suspend download of data of a type that can not be utilized.

It is also possible for the object data to comprise data type information in a header section, and for the download section 33 to compare data type information in the object data management information with data type information in the object data. In the event, when they do not match, the portable telephone unit 10 performs an error display. It is therefore possible for the user to know that downloaded data is not of an expected type and that it was not proper contents data.

With this embodiment, the portable telephone unit 10 compares data size information for the contents data in the management information with size of the contents data downloaded, and in the event that they do not match, carries out error display. Therefore, it is possible for the user to know that downloaded data is not of an expected size and that it was not proper contents data.

Also, with this embodiment, the permanent storage region is a region divided for each data type, and data type information for the contents data is included in the data management information for the contents data.

Therefore, it is possible to store contents data in divided regions (folders for data type etc.) within the permanent storage region according to data type of the contents data.

Also, with this embodiment, when download of the contents data is not completed due to the occurrence of a communication error etc., the portable telephone unit 10 performs a remaining portion download request, being a download request for a remaining portion that is a portion other than the portion that has already been downloaded. For this reason, even when contents data download terminated mid way through, download of only the portion remaining at the time the previous download operation terminates is carried out without performing downloading all of the object data again. Accordingly, it is possible to perform efficient download of contents data.

Note that, with the above-described embodiment, the portable telephone unit 10 performs a remaining download request only once, but it is also possible to perform this request a plurality of times.

Also, with this embodiment, data to be downloaded is contents data, but it is also possible to apply the present invention to general data.

Figure 15:
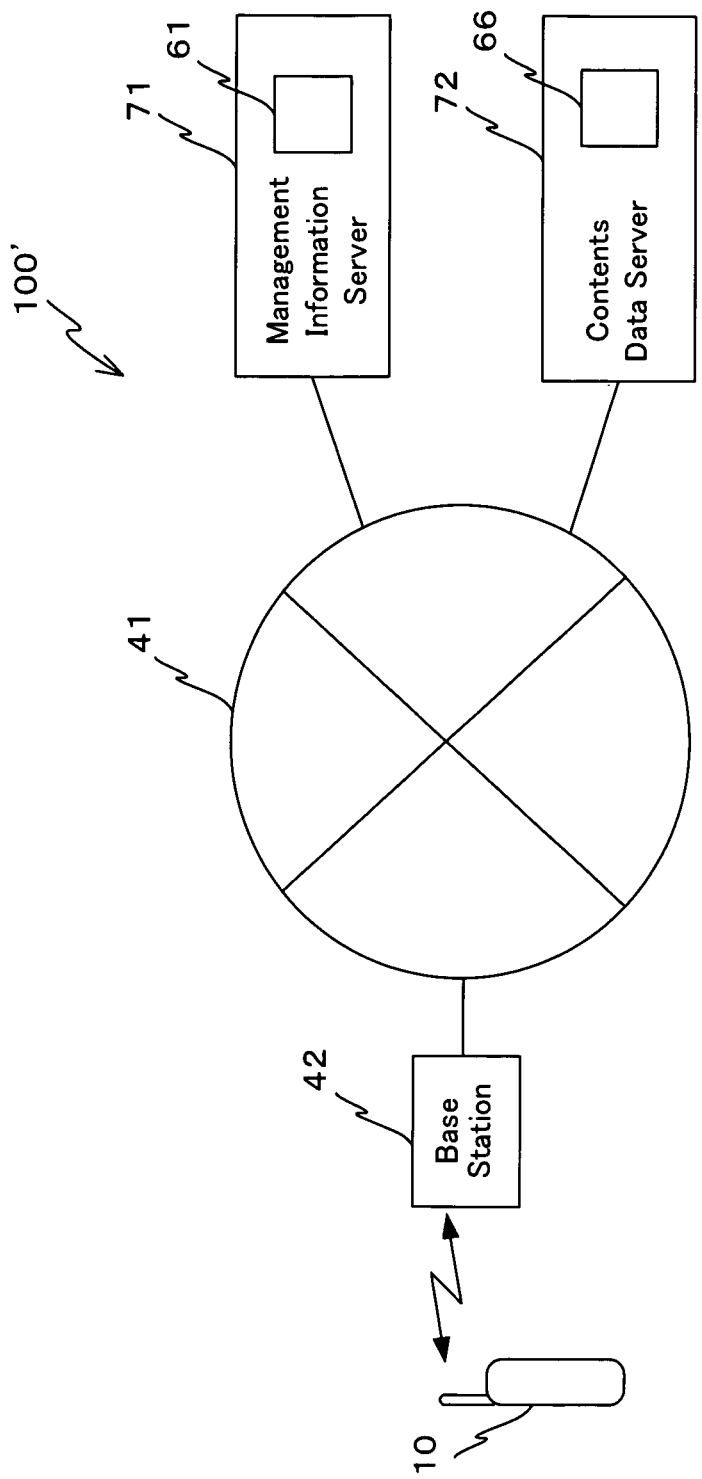
FIG. 15 is a drawing for describing a modified example.

Further, with the above-described embodiment, the contents server 50 manages both management information files and contents data files. Conversely, instead of the contents server 50, it is possible to have a structure where a management information server 71 for managing management information files and a contents data server 72 for managing contents data files are respectively provided, as with the data communication system 100' shown in FIG. 15.

Also, with the above-described embodiment, the present invention has been applied to a case where a communication terminal is a portable telephone unit, but it is also possible to apply the present invention to various other communication terminals, and also to a general information communication terminal.

Industrial Applicability

As has been described above, the data communication method and data communication system of the present invention are useful in cases of performing download of data to a communication terminal. Also, the mobile communication terminal of the present invention can be applied to a mobile terminal for carrying out download of data.

What is claimed is:

1. A data communication method, for downloading data to a communication terminal, comprising steps of:
requesting an object data management information, wherein the communication terminal transmits a request for object data management information, including size information for the object data to be downloaded;
receiving the object data management information, wherein the communication terminal receives the object data management information;
adjusting a data receive environment, wherein the communication terminal adjusts an environment for receiving the object data, based on the size information for the object data;
requesting a download, wherein the communication terminal transmits a download request for the object data;
receiving object data, wherein the communication terminal receives the object data; and detecting operating power remaining amount,
wherein the data receive environment adjustment step comprises a step of determining a data communication system used in downloading the object data, based on the size information for the object data, and comprises a step of determining a free space size; and
the communication terminal designates the determined communication system to transmit the object data download request in the download request step,
wherein when the size of the object data is less than a specified size, the data communication system is determined to be a first communication system, while when the size of the object data is the specified size or greater the data communication system is determined to be a second communication system in the data communication system determination step,
wherein the specified size is determined in dependence upon packet communication conditions,
wherein the download request step is executed in dependence upon the free space determination step,
wherein status information is displayed when the detected operating power remaining amount is not sufficient,
further comprising a step of confirming a download request, wherein the communication terminal having received the object data management information displays the object data size, and entrusts determination as to whether or not the download request step is executed to a user of the communication terminal,
wherein when the detected operating power remaining amount is not sufficient, download operations are stopped.

2. The data communication method of claim 1, further comprising a step of confirming a download request, wherein the communication terminal having received the object data management information displays the object data size, and entrusts determination as to whether or not the download request step is executed to a user of the communication terminal.

3. The data communication method of claim 1, wherein data type information for the object data is further comprised in the object data management information.

4. The data communication method of claim 3, wherein, when data type information among the object data management information is not of a type the communication terminal is expecting, an error is displayed and an operation for downloading the object data is suspended.

5. The data communication method of claim 4, wherein the object data comprises data type information in a header section, and the communication terminal compares data type information in the object data management information with data type information in the object data, and in the event that they do not match an error display is carried out.

6. The data communication method of claim 1, wherein the communication terminal compares object data size information in the object data management information with size of the object data downloaded, and in the event that they do not match carries out error display.

7. The data communication method of claim 1, further comprising steps of
requesting a remaining portion download, wherein the communication terminal requests download for a remaining portion, which is a portion after the portion that has already been downloaded, when download of the object data in the object data receiving step was not completed, and
receiving a remaining portion wherein the communication terminal receives the remaining portion.

8. A data communication method, for downloading data to a communication terminal, comprising steps of:
requesting an object data management information, wherein the communication terminal transmits a request for object data management information, including size information for the object data to be downloaded;
receiving the object data management information, wherein the communication terminal receives the object data management information;
adjusting a data receive environment, wherein the communication terminal adjusts an environment for receiving the object data, based on the size information for the object data;
requesting a download, wherein the communication terminal transmits a download request for the object data; and
receiving object data, wherein the communication terminal receives the object data, wherein
the data receive environment adjustment step comprises a step of determining a data communication system used in downloading the object data, based on the size information for the object data, and comprises a step of determining a free space size; and
the communication terminal designates the determined communication system to transmit the object data download request in the download request step, wherein
when the size of the object data is less than a specified size, the data communication system is determined to be a packet communication system, while when the size of the object data is the specified size or greater the data communication system is determined to be a circuit switching communication system in the data communication system determination step, wherein
the specified size is determined in dependence upon packet communication conditions, wherein
the download request step is executed in dependence upon the free space determination step,
further comprising a step of confirming a download request, wherein the communication terminal having received the object data management information displays the object data size, and entrusts determination as to whether or not the download request step is executed to a user of the communication terminal,
wherein,
in the download request confirmation step, operating power remaining amount capable of being supplied by a power supply of the communication terminal is detected, and when it is determined that the detected operating power remaining amount is not a sufficient margin for an object data download operation, display advising caution to the user of the mobile communication terminal is carried out.

9. A data communication method, for downloading data to a communication terminal, comprising steps of:
- requesting an object data management information, wherein the communication terminal transmits a request for object data management information, including size information for the object data to be downloaded;
- receiving the object data management information, *herein the communication terminal receives the object data management information;
- adjusting a data receive environment, wherein the communication terminal adjusts an environment for receiving the object data, based on the size information for the object data;
- requesting a download, wherein, the communication terminal transmits a download request for the object data; and
- receiving object data, wherein the communication terminal receives the object data, wherein the data receive environment adjustment step comprises a step of determining a data communication system used in downloading the object data, based on the size information for the object data; and the communication terminal designates the determined communication system to transmit the object data download request in the download request step, wherein when the size of the object data is less than a specified size, the data communication system is determined to be a packet communication system, while when the size of the object data is the specified size or greater the data communication system is determined to be a circuit switching communication system in the data communication system determination step, wherein the specified size is determined in dependence upon packet communication conditions, wherein the data receive environment adjustment step further comprises a step of determining a free space size, wherein the communication terminal that has received the object data management information determines whether or not the size of free space size in a region used for download by the communication terminal is larger than the object data size, and when the determination result of the free space determination step is affirmative, executing the download request step.

10. The data communication method of claim 9, wherein
the data receive environment adjustment step further comprises a step of suggesting a free space size securement, wherein when the determination is negative in the free space size determination step, securing the size of the free space to greater than or equal to the size of the object data is suggested to the user of the communication terminal.

11. The data communication method of claim 10, further comprising a step of confirming a download request, wherein
the communication terminal having received the object data management information displays the object data size, and entrusts determination as to whether or not the download request step is executed to a user of the communication terminal.

12. A data communication system, for downloading data to a communication terminal, wherein the communication terminal comprises:

object data management information request means, for requesting for object data management information, comprising size information for the object data wanting to be downloaded;

object data management information receive means for receiving the object data management information;

data receive environment adjustment means, for adjusting an environment for receiving the object data, based on size information for the object data inside the object data management information returned in response to the object data management information request;

free space determination means for determining whether or not there is free space;

download means for performing download control of the object data; and detection means for detecting operating power receiving amount, wherein the data receive environment adjustment means comprises data communication system determination means for determining a system used in downloading the object data, based on the size information for the object data, wherein when the size of the object data is less than a specified size, the data communication system determination means determines the system used in downloading the object data to be a first communication system, while when the size of the object data is the specified size or greater determines the system used in downloading the object data to be a second switching communication system, wherein the specified size is determined in dependence upon packet communication conditions, wherein the download means transmits an object data download request in dependence upon the determination result, wherein status information is displayed when the detected operating power remaining amount is not sufficient, further comprising a confirmation of a download request, wherein the communication terminal having received the object data management information displays the object data size, and entrusts determination as to whether or not a download request is executed to a user of the communication terminal, wherein when the detected operating power remaining amount is not sufficient, download operations are stopped.

13. The data communication system of claim 12, further comprising:
- a management information server for transmitting the object data management information to the communication terminal in response to the object data management information request; and
- an object data server for transmitting the object data to the communication terminal in response to the download request, using the determined communication system.

14. The data communication system of claim 13, wherein the management information server and the object data server are the same device.

15. The data communication system of claim 13, wherein the management information server and the object data device are mutually different server, and
location position information for the object data server device is further included in the object data management information.

16. The data communication system of claim 12, wherein the communication terminal is a mobile communication terminal.

17. A communication terminal, comprising:
object data management information request means, for requesting for object data management information, including size information for the object data to be downloaded;
an object data management information receiving step for receiving the object data management information;
data receive environment adjustment means, for adjusting an environment for receiving the object data, based on size information for the object data inside the object data management information returned in response to the object data management information request;
free space determination means for determining whether or not there is free space;
download means for performing download control of the object data; and
detection means for detecting operating power receiving amount,
wherein the data receive environment adjustment means comprises data communication system determination means for determining a data communication system used in downloading the object data, based on the size information for the object data,
wherein when the size of the object data is less than a specified size, the data communication system determination means determines the data communication system to be a first communication system, while when the size of the object data is the specified size or greater determines the data communication system to be a second communication system,
wherein the specified size is determined in dependence upon packet communication conditions,
wherein the download means transmits an object data download request in dependence upon the determination result.
wherein status information is displayed when the detected operating power remaining amount is not sufficient,
further comprising a confirmation of a download request, wherein the communication terminal having received the object data management information display the object data size, and entrusts determination as to whether or not a download request is executed to a user of the communication terminal,
wherein when the detected operating power remaining amount is not sufficient, download operations are stopped.

18. The communication terminal of claim 17, wherein, when download, of the object data is not completed, the download, means performs a remaining portion download request for a remaining portion, being a portion other than the portion that has already been downloaded, to the server device.

19. The communication terminal of claim 17 wherein the download means displays object data size before transmission of a download request, and entrusts determination as to whether or not the object data download request is executed to a user.

20. A communication terminal, comprising:
object data management information request means, for requesting for object data management information, including size information for the object data to be downloaded;
an object data management information receiving step for receiving the object data management information;
data receive environment adjustment means, for adjusting an environment for receiving the object data, based on size information for the object data inside the object data management information returned in response to the object data management information request;
free space determination means for determining whether or not there is free space; and
download means for performing download control of the object data, wherein
the data receive environment adjustment means comprises data communication system determination means for determining a data communication system used in downloading the object data, based on the size information for the object data, wherein
when the size of the object data is less than a specified size, the data communication system determination means determines the data communication system to be a packet communication system, while when the size of the object data is the specified size or greater determines the data communication system to be a circuit switching communication system, wherein
the specified size is determined in dependence upon packet communication conditions, wherein
the download means transmits an object data download request in dependence upon the determination result, wherein
the download means detects operating power remaining amount capable of being supplied by a power supply before transmission of the download request, and
when it is determined that the detected operating power remaining amount is not a sufficient margin for an object data download operation, display advising caution to the user is carried out.

21. A communication terminal, comprising:
object data management information request means, for requesting for object data management information, including size information for the object data to be downloaded;
an object data management information receiving step for receiving the object data management information;
data receive environment adjustment means, for adjusting an environment for receiving the object data, based on size information for the object data inside the object data management information returned in response to the object data management information request; and
download means for performing download control of the object data, wherein
the data receive environment adjustment means comprises data communication system determination means for determining a data communication system used in downloading the object data, based on the size information for the object data, wherein
when the size of the object data is less than a specified size, the data communication system determination means determines the data communication system to be a packet communication system, while when the size of the object data is the specified size or greater determines the data communication system to be a circuit switching communication, system, wherein
the specified size is determined in dependence upon packet communication conditions, wherein
the data receive environment adjustment means comprises free space determination means for determining whether or not there is free space for storing the object data in a permanent storage region where storage data is not deleted unless there is an explicit command from the user, based on the object data size information, and
when the determination result by the free space determination means is affirmative, the download means transmits the object data download request, and receives object data returned in response to the download request.

22. The communication terminal of claim 21, wherein, when the determination result is negative, the free space determination means suggest securement of the free space size of greater than or equal to the object data size to the user.

23. The communication terminal of claim 21, wherein the download means displays object data size before transmission of a download request, and entrusts determination as to whether or not the object data download request is executed to a user.

24. The communication terminal of claim 21, wherein the permanent storage region is a region divided for each data type, and data type information for the object data is further included in the object data management information.

* * * * *